(12) United States Patent
Clark

(10) Patent No.: US 11,111,064 B2
(45) Date of Patent: Sep. 7, 2021

(54) CASELESS TIER SHEET

(71) Applicant: Rehrig Pacific Company, Los Angeles, CA (US)

(72) Inventor: Suzanne Whitfield Clark, Santa Monica, CA (US)

(73) Assignee: Rehrig Pacific Company, Los Angeles, CA (US)

(*) Notice: Subject to any disclaimer, the term of this patent is extended or adjusted under 35 U.S.C. 154(b) by 309 days.

(21) Appl. No.: 14/599,846

(22) Filed: Jan. 19, 2015

(65) Prior Publication Data

US 2015/0298878 A1    Oct. 22, 2015

Related U.S. Application Data

(60) Provisional application No. 61/928,985, filed on Jan. 17, 2014.

(51) Int. Cl.
*B65D 71/70* (2006.01)
*B65D 21/02* (2006.01)

(52) U.S. Cl.
CPC ......... *B65D 71/70* (2013.01); *B65D 21/0224* (2013.01)

(58) Field of Classification Search
CPC .... B65D 71/70; B65D 21/0224; B65D 85/80; B65D 1/34; B65D 1/243; B65D 2501/24019; B65D 2501/24267; B65D 2501/24273; B65D 85/305; B65D 2501/24152; B65D 2501/245; B65D 2501/24184; B65D 2501/24681; B65D 1/36; B65D 81/133; B65D 2519/00965; B65D 21/046; B65D 19/004; Y10S 220/02

USPC ........ 206/427, 429, 203, 511, 560; 220/514, 220/519, 516, 515, 517, 513
See application file for complete search history.

(56) References Cited

U.S. PATENT DOCUMENTS

| | | | |
|---|---|---|---|
| 2,626,079 A | 1/1953 | Keller | |
| 2,743,030 A * | 4/1956 | Read, Jr. ................ | B65D 1/243 |
| | | | 211/126.1 |
| 2,843,280 A | 7/1958 | Stopps | |
| 2,982,419 A | 5/1961 | Shiels | |
| 3,151,576 A | 10/1964 | Patterson | |
| 3,332,574 A | 7/1967 | Earp | |
| 3,333,727 A | 8/1967 | Belcher et al. | |
| 3,349,943 A | 10/1967 | Box | |
| 3,416,694 A | 12/1968 | Bebb | |
| 3,680,735 A | 8/1972 | Lucas | |
| 3,948,190 A | 4/1976 | Cook, III et al. | |

(Continued)

FOREIGN PATENT DOCUMENTS

EP        2815991        12/2014

OTHER PUBLICATIONS

U.S. Appl. No. 16/149,383.

*Primary Examiner* — J. Gregory Pickett
*Assistant Examiner* — Jenine Pagan
(74) *Attorney, Agent, or Firm* — Carlson, Gaskey & Olds, P.C.

(57) ABSTRACT

A tier sheet includes a deck having a support surface. A plurality of walls extend downward to define lower recesses for receiving the upper ends of containers therebelow. In one embodiment, the tier sheet is a single thermoformed sheet and includes a plurality of upper recesses formed in the deck, each upper recess defined between an outer wall and a column. In another embodiment, the tier sheet is injection molded.

28 Claims, 22 Drawing Sheets

(56) References Cited

U.S. PATENT DOCUMENTS

| | | |
|---|---|---|
| 3,982,654 A | 9/1976 | Gottsegen |
| 4,162,738 A | 7/1979 | Wright |
| 4,344,530 A | 8/1982 | deLarosiere |
| 4,567,981 A * | 2/1986 | Headon .................. A47F 5/118 |
| | | 206/429 |
| 4,618,059 A | 10/1986 | Cochram |
| 4,653,651 A | 3/1987 | Flum |
| 4,722,440 A * | 2/1988 | Johnston ................ B65D 71/70 |
| | | 206/319 |
| 4,757,910 A | 7/1988 | Box |
| 4,846,365 A | 7/1989 | Steinlein |
| 4,848,573 A * | 7/1989 | Salacuse ................ B65D 71/70 |
| | | 206/427 |
| 4,865,202 A | 9/1989 | Day |
| 5,031,761 A | 7/1991 | de Larosiere |
| 5,038,961 A | 8/1991 | Watanabe et al. |
| 5,060,819 A | 10/1991 | Apps |
| 5,071,026 A | 12/1991 | Apps |
| 5,263,605 A | 11/1993 | Caton |
| 5,360,112 A | 11/1994 | Beauchamp |
| 5,377,862 A * | 1/1995 | Oakes ................... B65D 71/70 |
| | | 206/433 |
| 5,445,273 A | 8/1995 | Apps |
| 5,651,459 A * | 7/1997 | Umiker ................. B65D 71/70 |
| | | 206/203 |
| 5,823,376 A | 10/1998 | McGrath |
| 5,826,712 A | 10/1998 | Aikio |
| 6,047,844 A | 4/2000 | McGrath |
| 6,073,793 A | 6/2000 | Apps et al. |
| 6,223,911 B1 | 5/2001 | Weaver |
| 6,279,770 B1 | 8/2001 | Osbakk et al. |
| 6,367,645 B1 * | 4/2002 | Trygg ................ B65D 21/0231 |
| | | 206/509 |
| 7,188,847 B1 | 3/2007 | Friedman |
| 8,522,967 B2 | 9/2013 | Lindstrom |
| 8,770,568 B2 | 7/2014 | Buck et al. |
| 9,315,291 B2 | 4/2016 | Kelly et al. |
| 9,327,890 B1 | 5/2016 | Connelly |
| 9,409,688 B2 | 8/2016 | Kelly et al. |
| 2001/0019063 A1 | 9/2001 | Apps |
| 2003/0070957 A1 | 4/2003 | Apps et al. |
| 2007/0246392 A1 | 10/2007 | Stahl |
| 2009/0301926 A1 * | 12/2009 | Ogburn ................ B65D 71/70 |
| | | 206/564 |
| 2010/0326933 A1 * | 12/2010 | Manuel ................ B65D 71/70 |
| | | 211/71.01 |
| 2011/0284411 A1 | 11/2011 | Delbrouck et al. |
| 2012/0317929 A1 | 12/2012 | Ramberg et al. |
| 2013/0087477 A1 | 4/2013 | Kuhn et al. |
| 2013/0199953 A1 | 8/2013 | Lindstrom |
| 2014/0197064 A1 * | 7/2014 | Prince ................... B65D 71/70 |
| | | 206/501 |
| 2014/0299418 A1 | 10/2014 | Meijer |
| 2014/0305741 A1 | 10/2014 | Jowett et al. |
| 2014/0367297 A1 * | 12/2014 | Kelly ................ B65D 71/0096 |
| | | 206/509 |
| 2015/0001114 A1 * | 1/2015 | Kelly .................... B65D 19/00 |
| | | 206/386 |
| 2015/0344167 A1 | 12/2015 | Clark |
| 2016/0016689 A1 | 1/2016 | Apps et al. |
| 2016/0130057 A1 | 5/2016 | Stahl |
| 2016/0200480 A1 | 7/2016 | Clark |
| 2018/0037448 A1 | 2/2018 | Lacher |
| 2019/0135601 A1 | 5/2019 | Guerry et al. |

* cited by examiner

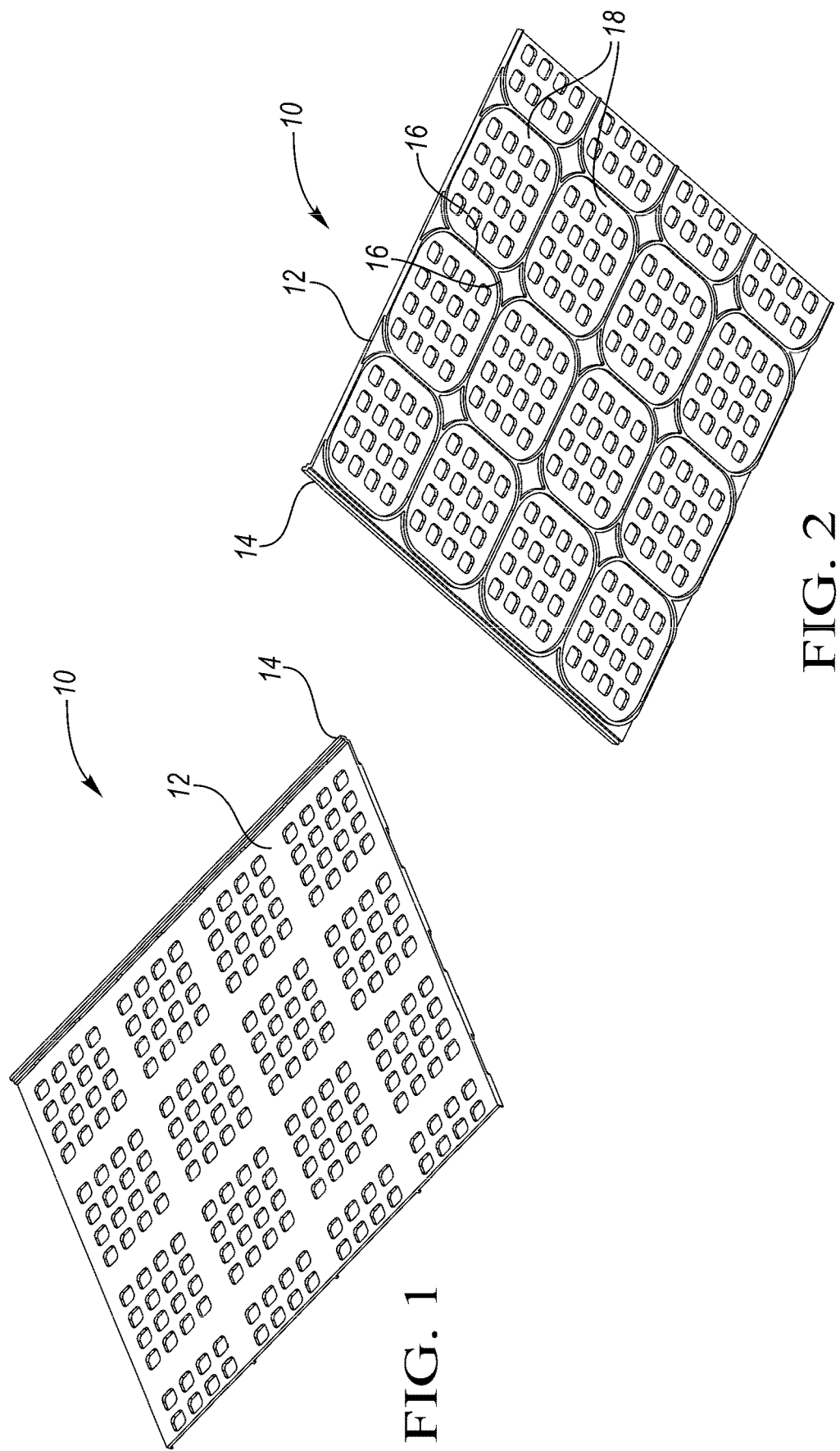

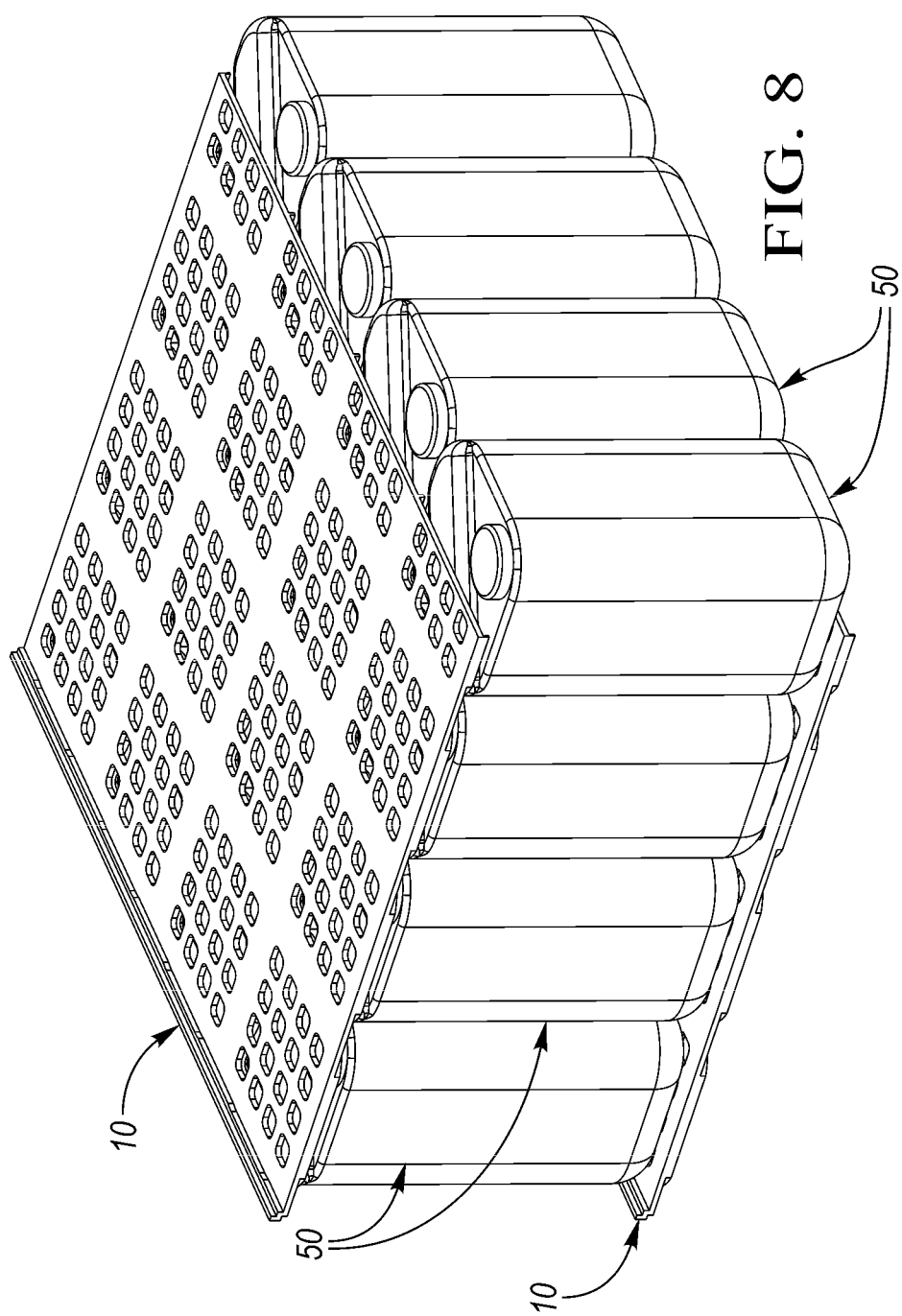

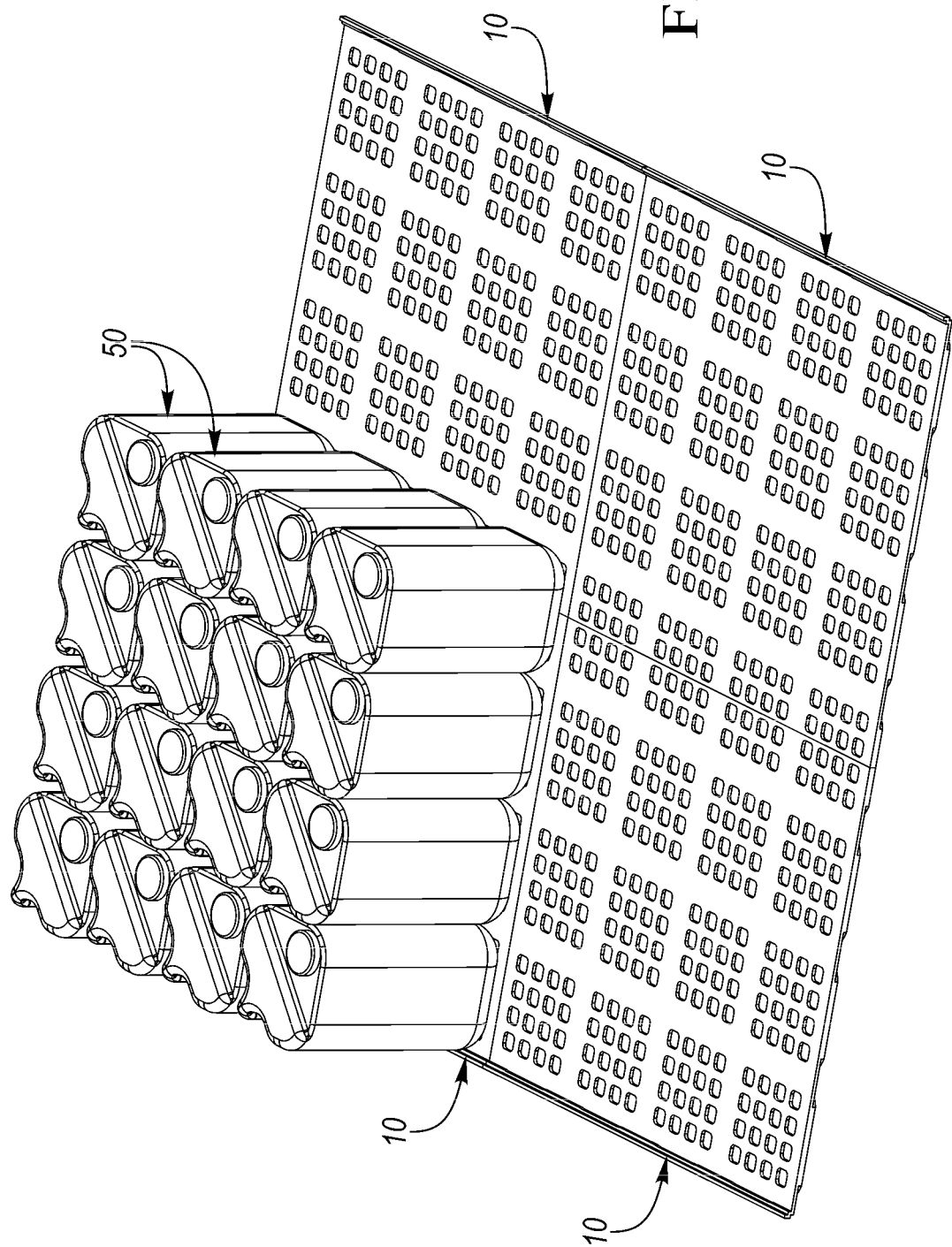

CASELESS TIER SHEET

BACKGROUND

Dairy (e.g. milk) is often sold in 1 gallon plastic containers or jugs. The traditional milk jug has a generally rectangular cross-section body tapering down to a neck portion with a cap. The milk jugs may be shipped to stores in crates, which are then returned and reused.

More recently, "caseless" milk jugs have a generally rectangular (generally square with rounded corners) cross section, including the uppermost portion of the jug, which includes short neck portion protruding up from an upper wall. A raised portion on the upper wall is generally coplanar with the cap on the neck. Corrugated cardboard tier sheets separate layers of the milk jugs.

SUMMARY

Tier sheets disclosed herein provide increased stability for the traditional or "caseless" dairy containers, while providing a more space-efficient, reusable solution. A tier sheet includes a deck having a support surface. A plurality of walls extend downward to define lower recesses for receiving the upper ends of containers therebelow.

In one embodiment, the tier sheet is injection molded. The disclosed example injection molded tier sheet is specifically designed for the caseless dairy containers described above, but could be modified for other types of containers.

In another embodiment, the tier sheet is a single thermoformed sheet and includes a plurality of upper recesses formed in the deck, each upper recess defined between an outer wall and a column The disclosed example thermoformed tier sheet is specifically designed for the traditional plastic milk jugs, but could be modified for other types of containers.

BRIEF DESCRIPTION OF THE DRAWINGS

The drawings can be briefly described as follows:

FIG. 1 is a top perspective view of a tier sheet according to a first embodiment.

FIG. 2 is a bottom perspective view of the tier sheet of FIG. 1.

FIG. 8 shows the tier sheet and jugs of FIG. 6 with an identical tier sheet stacked thereon.

FIG. 9 shows the tier sheet and jugs of FIG. 6 adjacent three identical tier sheets.

DETAILED DESCRIPTION

Figure 3:
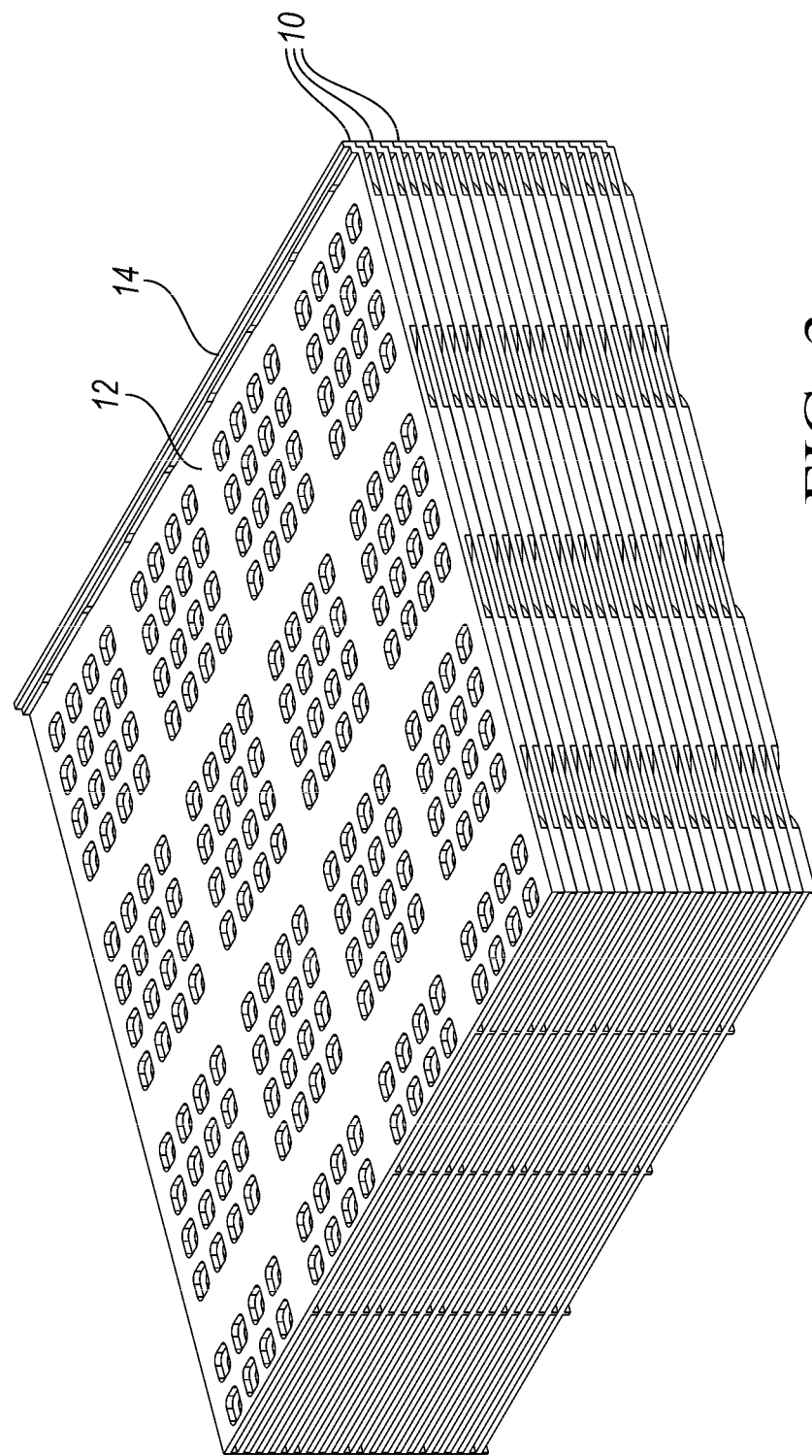
FIG. 3 shows a plurality of the empty tier sheets of FIG. 1 stacked.

A tier sheet 10 according to a first embodiment is shown in FIG. 1. The tier sheet 10 includes a generally rectangular, generally planar deck 12 having a generally flat support surface with apertures therethrough for drainage and weight reduction. A lip 14 protrudes upward from the deck 12 along at least one of the perimeter edges of the deck 12.

FIG. 2 is a bottom perspective view of the tier sheet 10. A plurality of walls or ribs 16 protrude downward from the bottom surface of the deck 12. The ribs 16 define a plurality of generally rectangular (such as square) recesses 18. As shown, the recesses 18 may have rounded corners and may be arranged in an array, leaving diamond-shaped recesses at the intersection of every four recesses 18.

The embodiment of FIGS. 1-12 is injection molded as a single piece of plastic.

FIG. 3 shows a plurality of the tier sheets 10 stacked empty for efficient shipping and storage. The tier sheets 10 nest to the extent that the decks 12 can stack on one another with the lips 14 nesting somewhat. The lips 14 each include an upper rib offset outward from a lower rib, so that the upper rib of a lower tier sheet 10 can be received behind the lower rib of the upper tier sheet 10 (and below the upper rib of the upper tier sheet 10). This lets the ribs 16 on the bottom of the upper tier sheet 10 rest on the support surface of the lower tier sheet 10, and stacks the tier sheets 10 parallel to one another for a stable stack.

Figure 4:
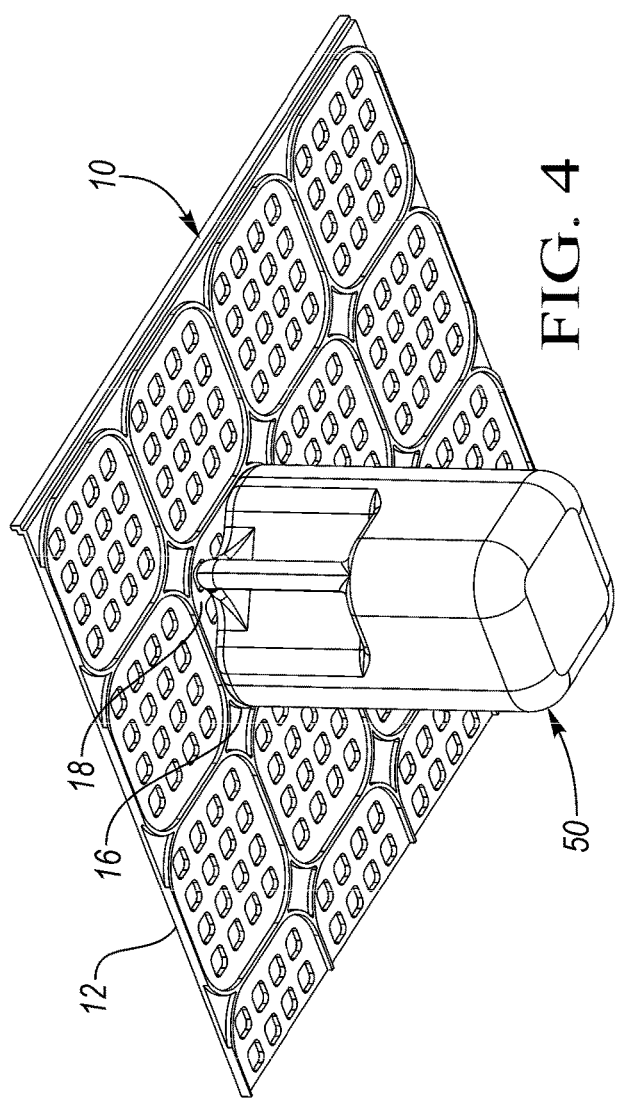
FIG. 4 is a bottom perspective view of the tier sheet of FIG. 1 stacked on a jug.
Figure 5:
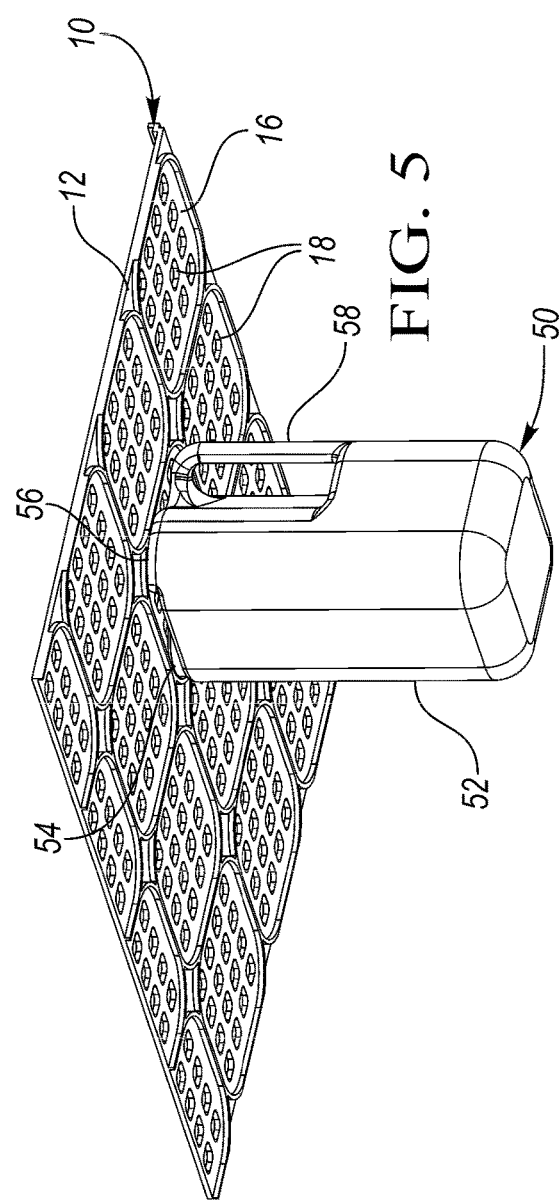
FIG. 5 is another perspective view of the tier sheet and jug of FIG. 4.

FIGS. 4 and 5 show the tier sheet 10 stacked on a beverage container 50, which in this example is a one gallon caseless plastic jug 50 have a body portion 52 with a generally rectangular (or square) cross section (with somewhat rounded corners). A cap 54 selectively closes an opening of the container 50. The upper wall of the container 50 also includes a raised portion 56 having a height the same as the cap 54. As shown in FIGS. 4 and 5, the upper portion of the container 50 fits snugly in any one of the recesses 18. The cap 54 abuts one of the ribs 16. The raised portion 56 of the container 50 abuts two ribs 16.

Figure 7:
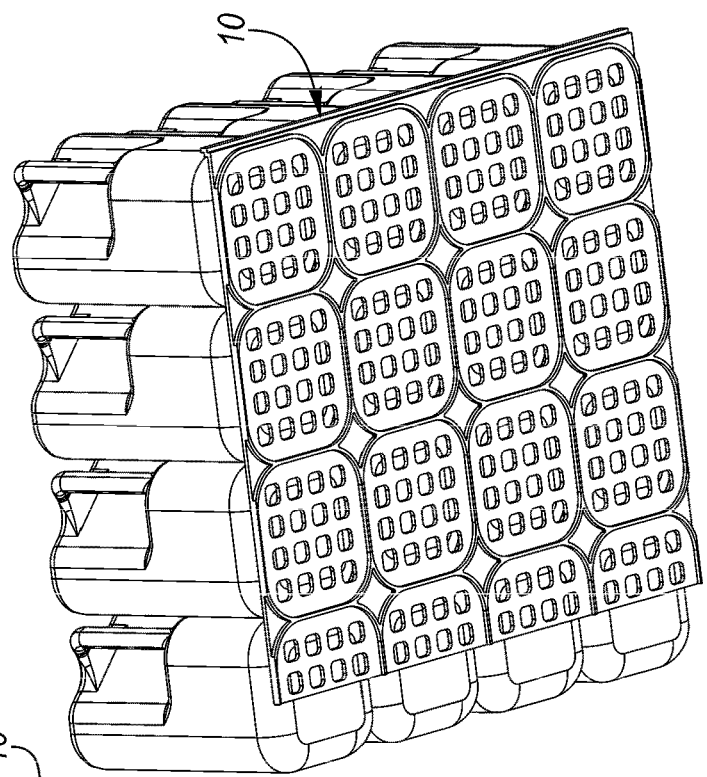
FIG. 7 is a bottom perspective view of the tier sheet and jugs of FIG. 6.
Figure 6:
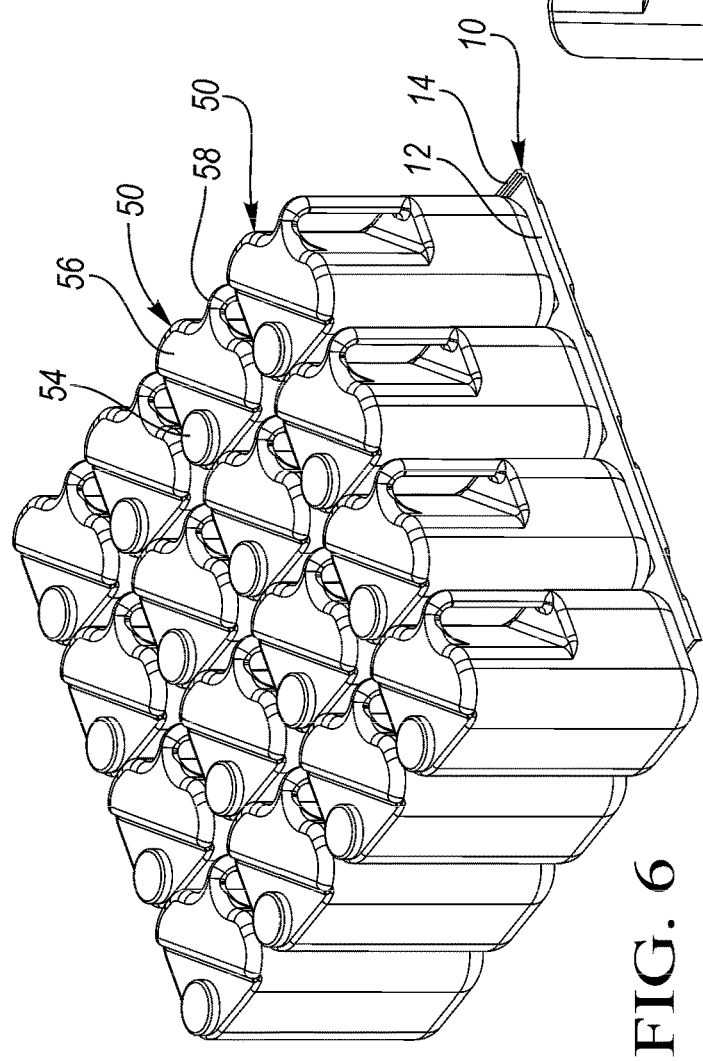
FIG. 6 shows the tier sheet of FIG. 1 loaded with a plurality of jugs.

FIGS. 6 and 7 show a plurality of the containers 50 arranged on the tier sheet 10. The generally flat sides of the body portions 52 abut one another for compact and efficient use of space. The containers 50 are supported on the flat support surface of the deck 12 of the tier sheet 10. As shown in FIG. 7, one row of recesses 18 on the bottom of the tier sheet 10 is only a half, such that half of each container 50 in that row extends off the tier sheet 10.

As shown in FIG. 8, another tier sheet 10 is stacked on the array of containers 50. The upper portion of each container 50 is received in each of the recesses 18 (not visible in FIG. 8) in the manner of FIGS. 4 and 5. This provides increased stability in a stack of containers 50. Again, one row of containers 50 is only half covered by the tier sheet 10.

Figure 10:
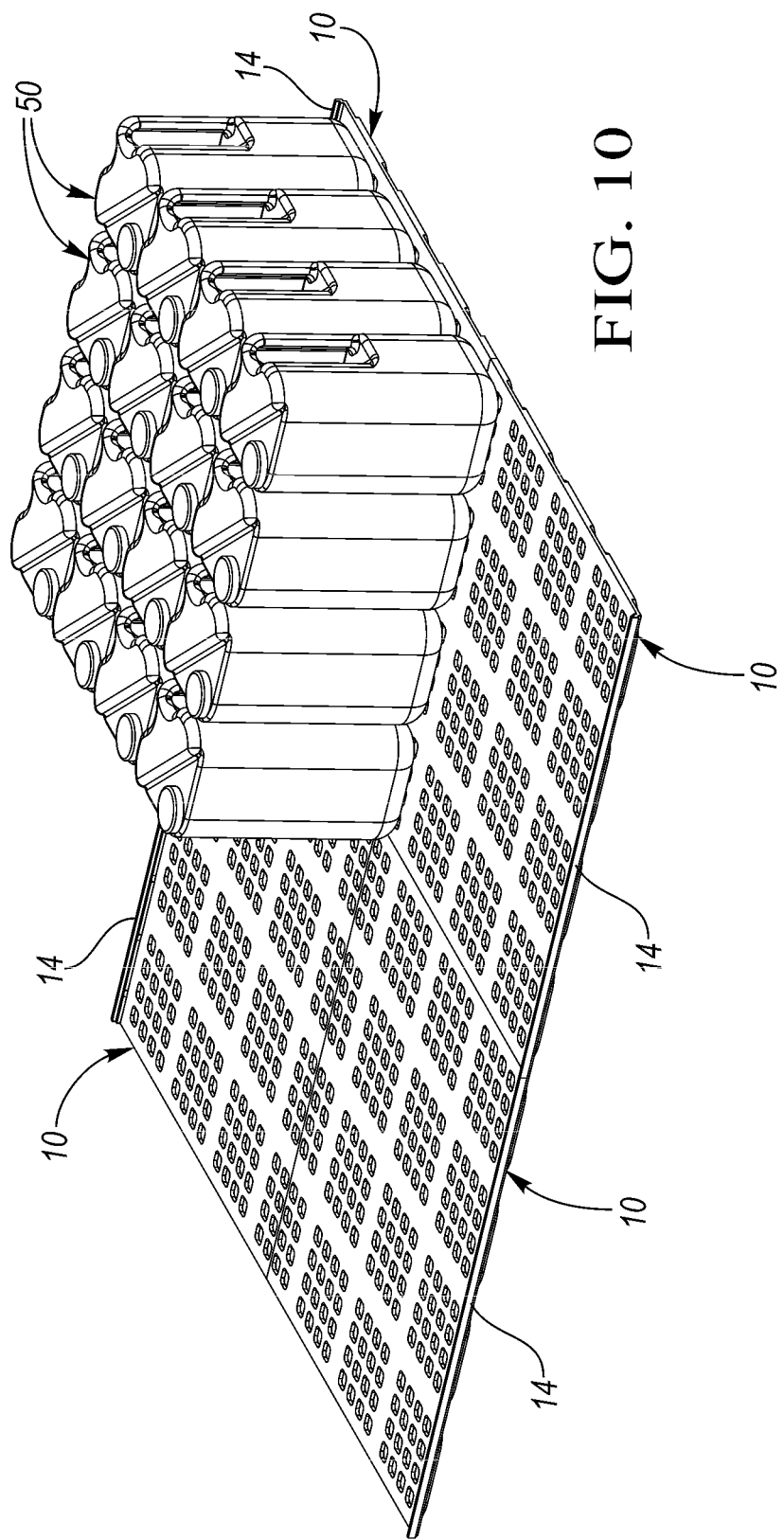
FIG. 10 is an alternate view of the tier sheet and jugs of FIG. 9.

FIGS. 9 and 10 show four of the tier sheets 10 abutting one another to provide a continuous large support surface for containers 50. The tier sheets 10 are arranged so that the lips 14 of the tier sheets 10 are on opposite side edges of the combined surface. One row of containers 50 on each tier sheet 10 straddles two of the tier sheets 10.

Figure 11:
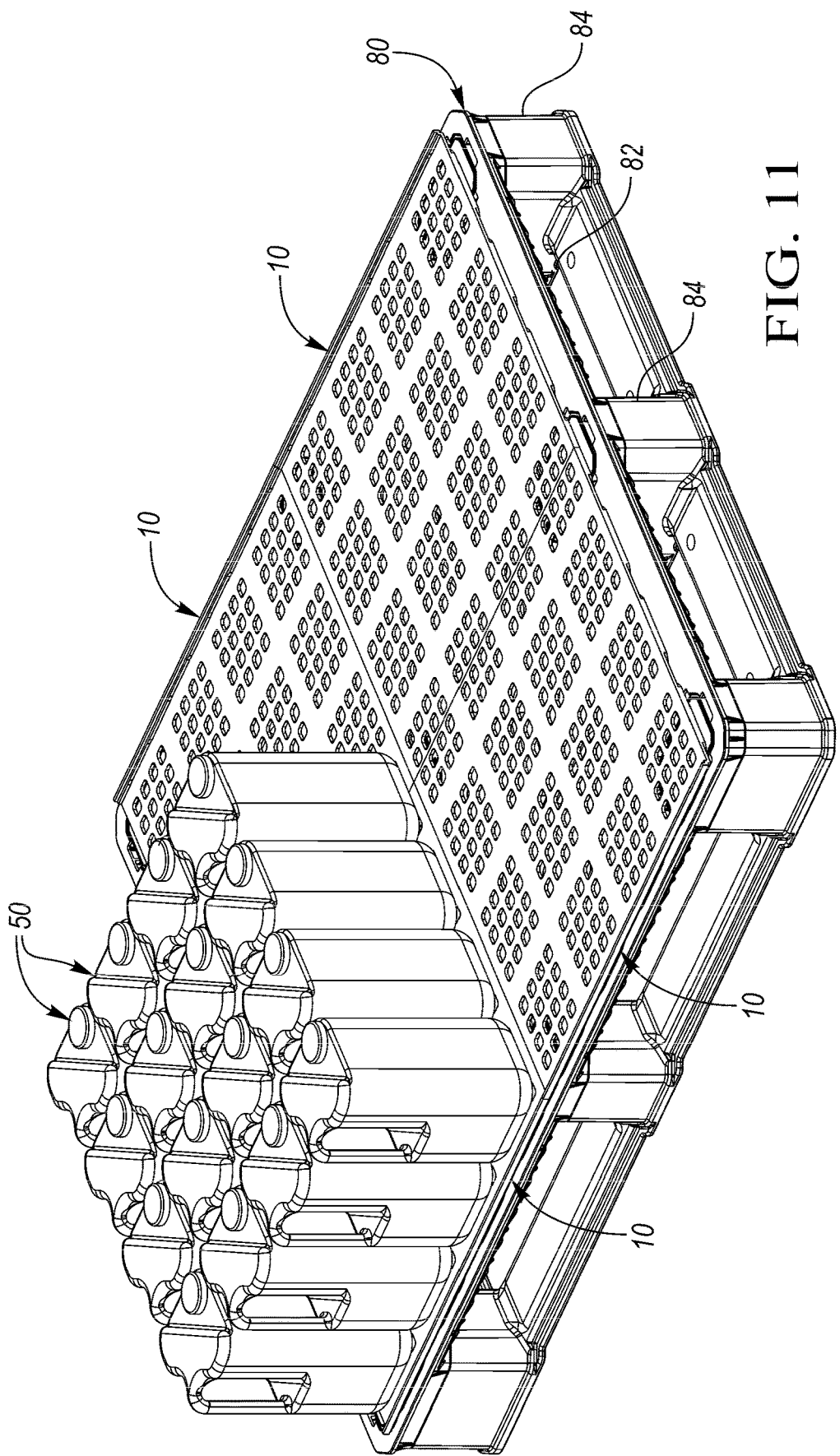
FIG. 11 shows the tier sheets and jugs of FIG. 9 on a pallet.

As shown in FIG. 11, the four tier sheets 10 are sized to fit on a pallet 80. The pallet 80 includes a deck 82 supported by a plurality of columns 84. The four tier sheets 10 are each approximately the size of one quarter of the pallet deck 82 and thus may be considered quarter tier sheets 10. Alternatively full, ½ or ⅓ tier sheets could also be provided.

Figure 12:
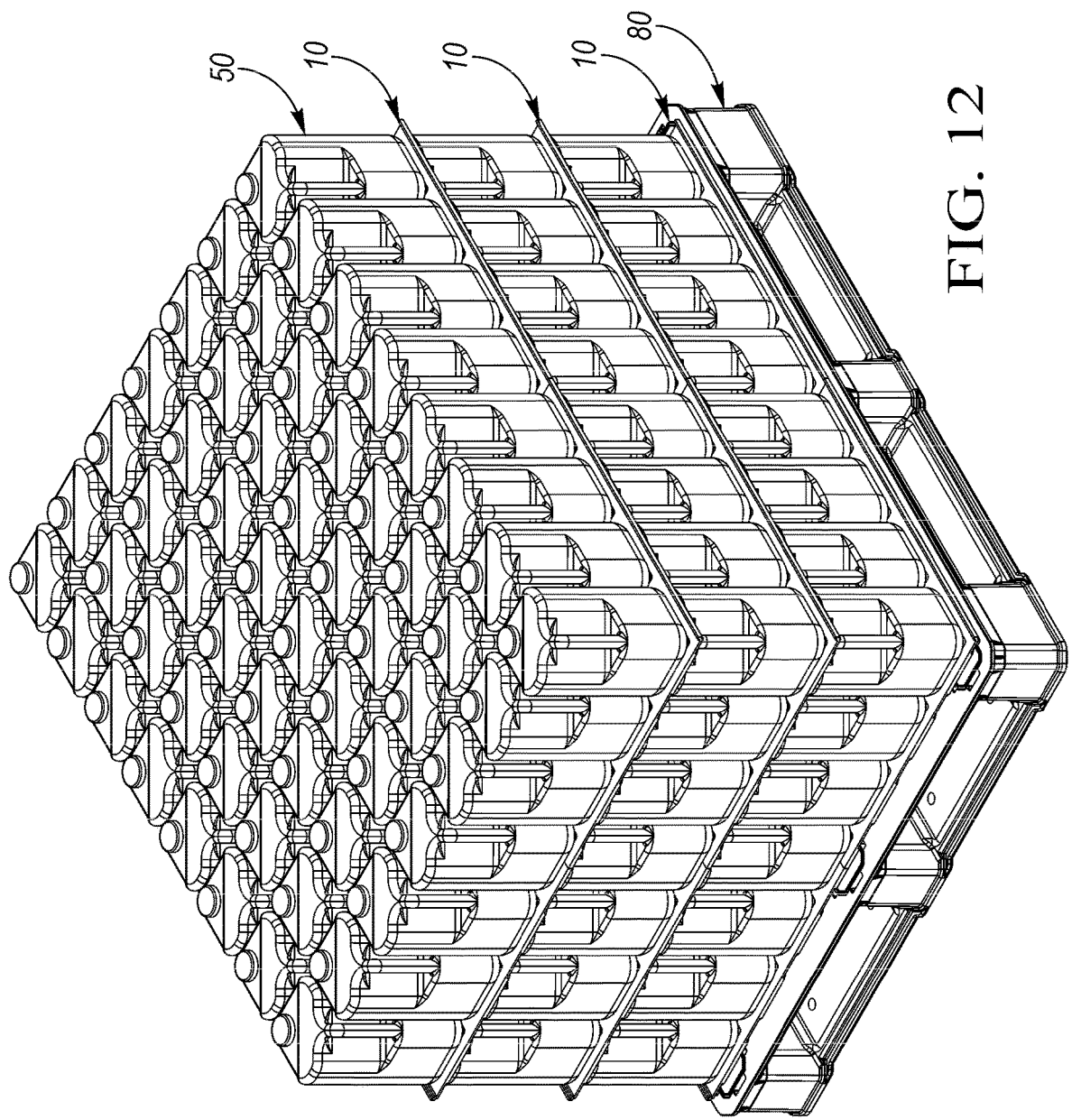
FIG. 12 shows a plurality of the tier sheets and jugs of FIG. 11 stacked in multiple layers on the pallet.

In FIG. 12, layers of containers 50 are stacked on the pallet 80 with a layers of tier sheets 10 between each layer of containers 50 to improve stability. The pallet 80, tier sheets 10 and containers 50 could be placed in a store in the configuration shown in FIG. 12 for sale to consumers. The consumers can select containers 50 from the tier sheets 10. The containers 50 can be easily slid across the deck 12 of the tier sheet to an outside edge. When one of the tier sheets 10 is empty, that tier sheet 10 can be removed easily to access the containers 50 below that tier sheet 10. In other words, it is not necessary for the consumers to remove all of the containers 50 in a single layer before accessing the next layer down. The interlocking of the upper portions of the containers 50 and the recesses 18 on the underside of the tier sheets 10 provides increased stability of the stack, even when one or more of the tier sheets 10 in a particular layer have been removed.

When empty, the tier sheets 10 can be stacked as shown in FIG. 3 and shipped back to the distribution facility with the pallet 80 to be reloaded with containers 50 and shipped back to the store.

Figure 13:
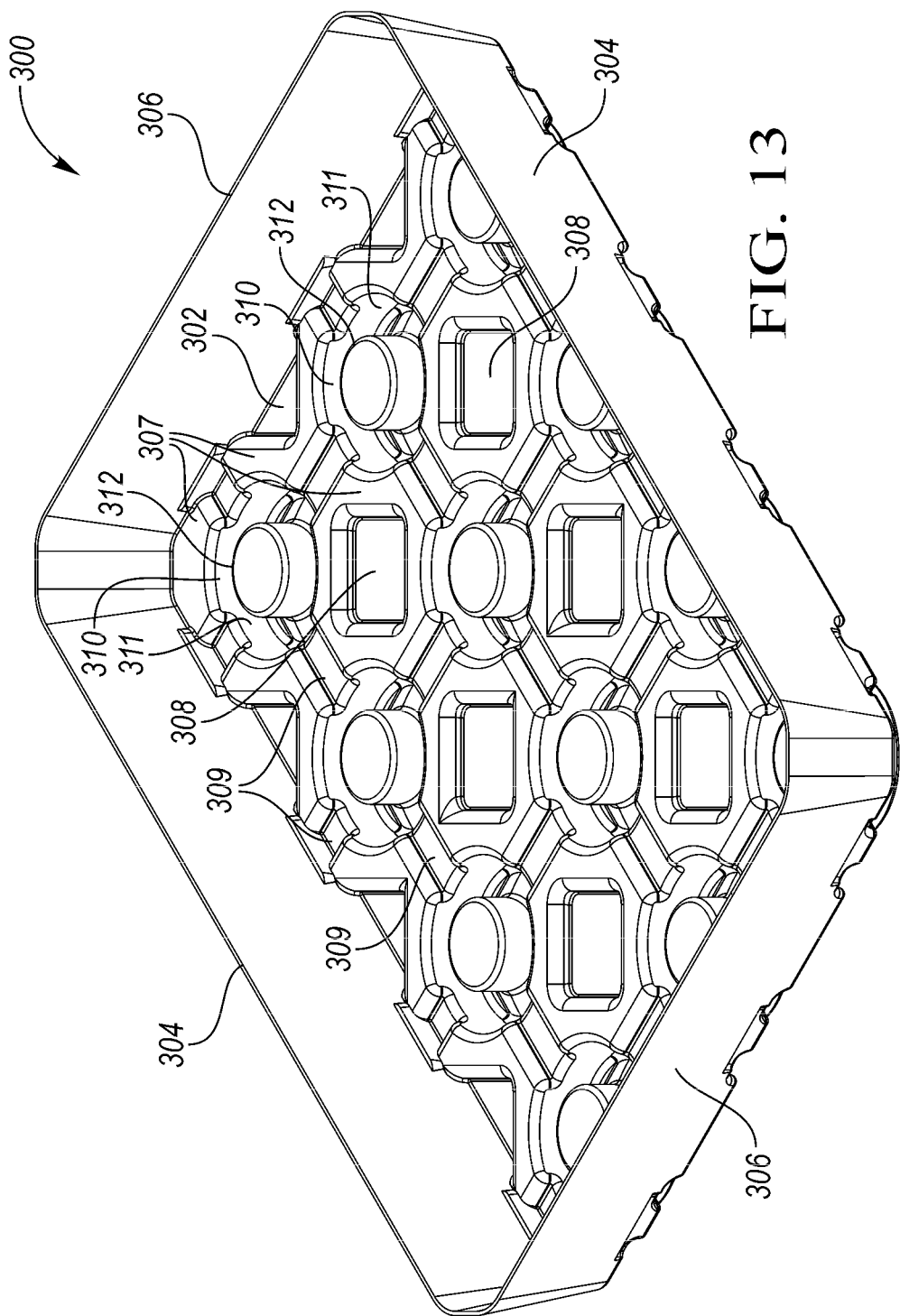
FIG. 13 is a perspective view of a tier sheet according to a second embodiment.

FIGS. 13-28 illustrate another sheet 300 for stacking milk jugs 50. Referring to FIG. 13, the sheet 300 is single thermoformed plastic sheet. The sheet 300 generally includes a deck or bottom wall 302, side walls 304 and end walls 306. The side walls 304 and end walls 306 angle outward as they extend upward from the bottom wall 302, such that empty identical sheets 300 could be nested in one another. The bottom wall 302 includes a support surface 307 interrupted by a plurality of annular recesses 310 (or upper recesses) defining a plurality of cylindrical columns 312. Each annular recess 310 is defined between an outer cylindrical wall 311 and the cylindrical column 312. The uppermost surface of the cylindrical column 312 is coplanar with the support surface 307. A plurality of recessed channels 309 connect the annular recesses 310 to one another. The recessed channels 309 are less than half as deep as the annular recesses 310 but add reinforcement to the support surface 307. A plurality of diamond shaped recesses 308 are formed in the support surface 307 diagonally between the annular recesses 310. The diamond shaped recesses 308 are approximately the same depth as the recessed channels 309. Outer recesses or triangular recesses are formed adjacent the side walls 304 and end walls 306.

Figure 14:
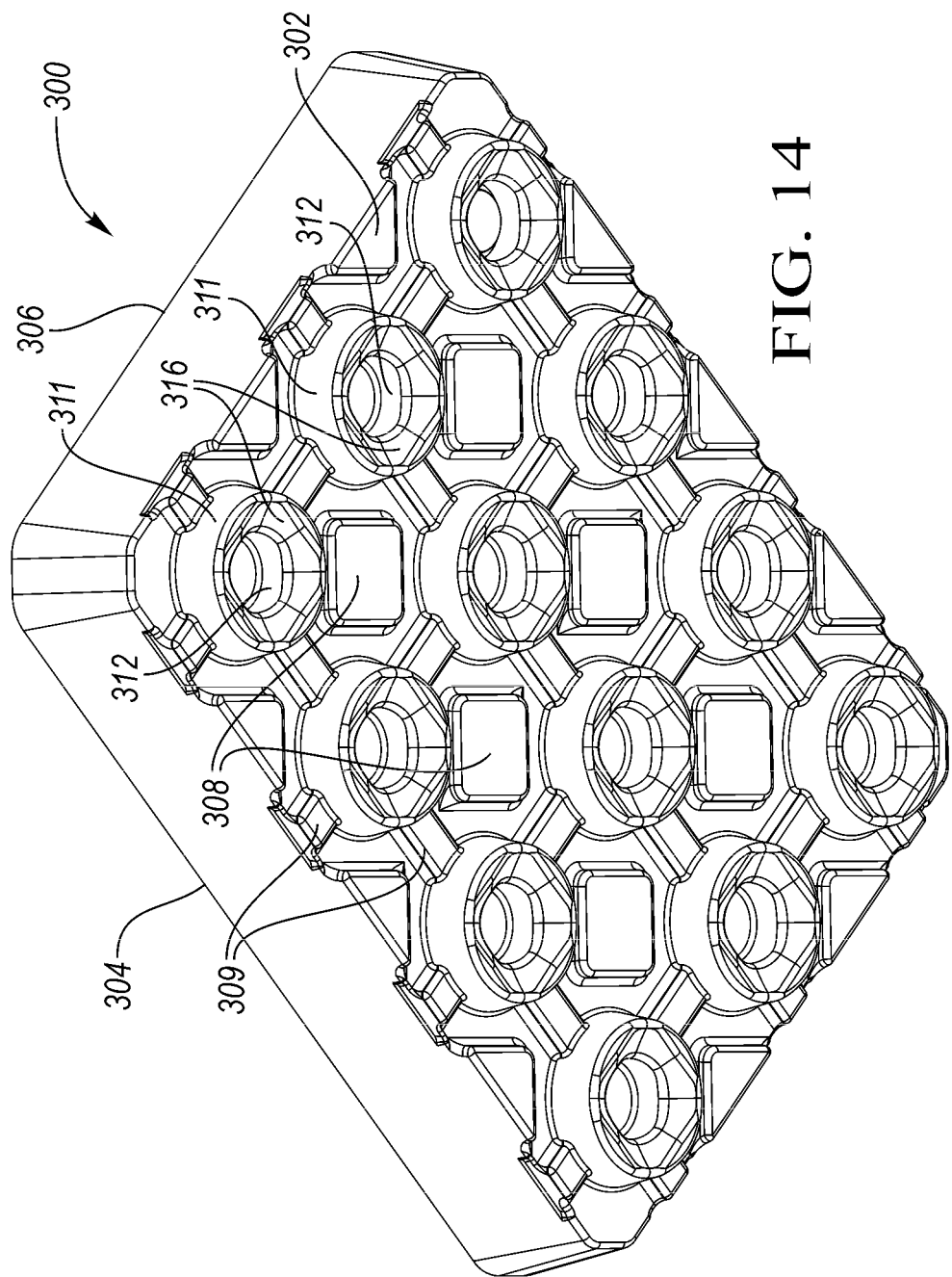
FIG. 14 is a bottom perspective view of the tier sheet of FIG. 13.

FIG. 14 is a bottom perspective view of the sheet 300. The outer cylindrical walls 311 project downward to a lowermost surface of the sheet 300. The bottom of each outer cylindrical wall 311 is connected to the bottom of one of the cylindrical columns 312 by a tapered annular wall 316 tapering upward and inward from the outer cylindrical wall 311 to the cylindrical column 312. The inner surface of the cylindrical column 312 defines a cylindrical recess.

Figure 15:
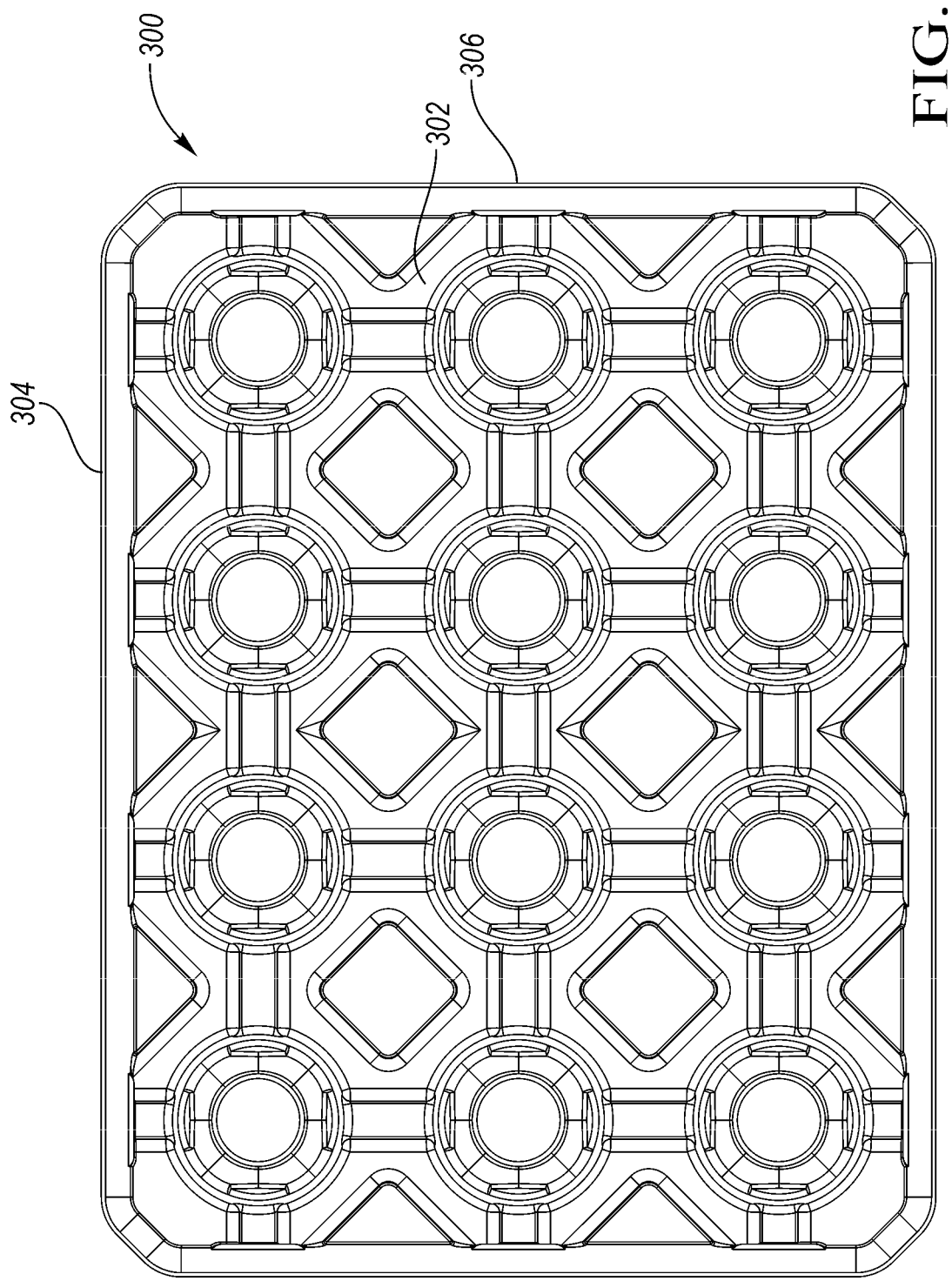
FIG. 15 is a top view of the tier sheet of FIG. 13.
Figure 16:
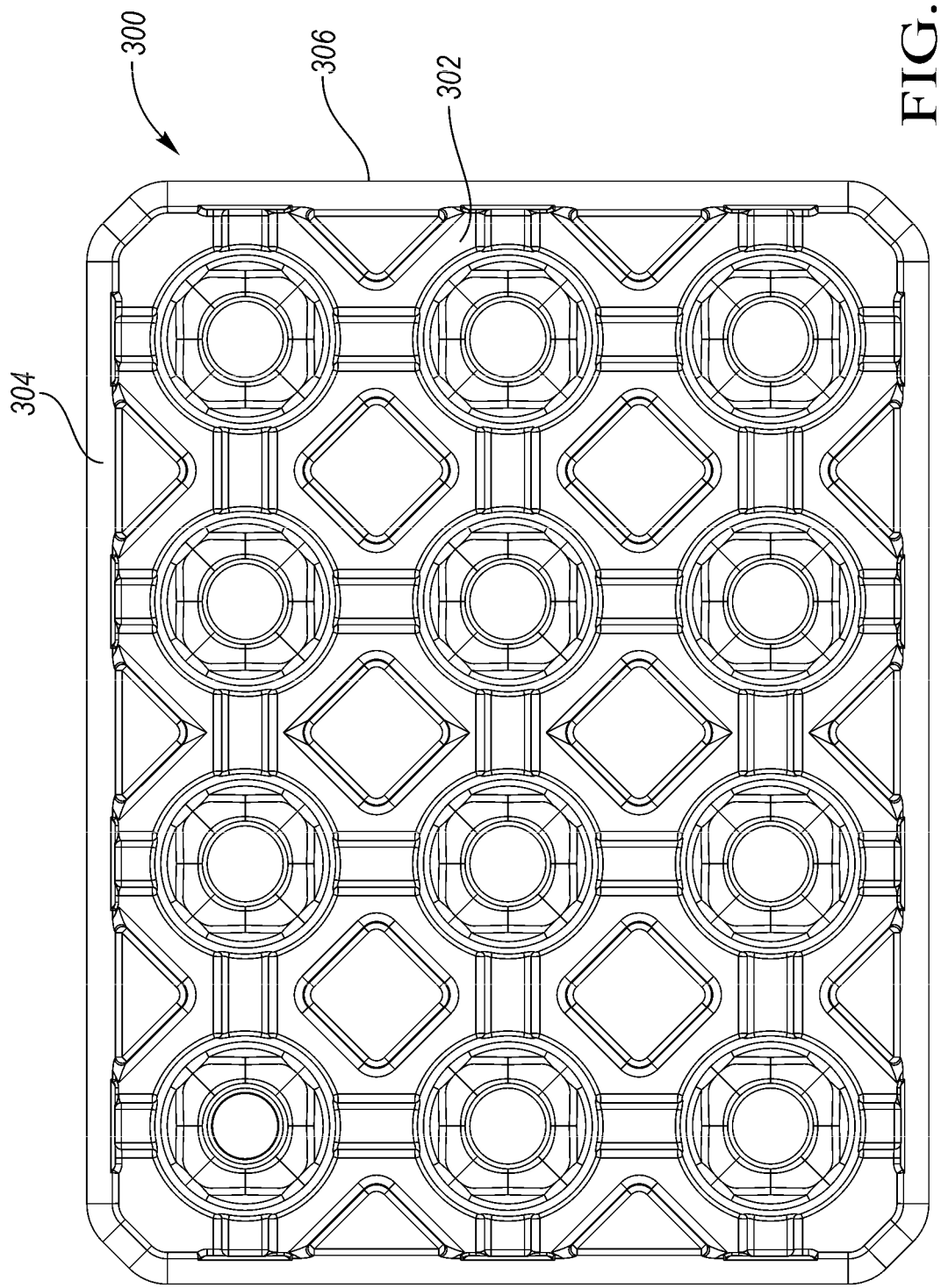
FIG. 16 is a bottom view of the tier sheet of FIG. 13.

FIG. 15 is a top view of the sheet 300. FIG. 16 is a bottom view of the sheet 300.

Figure 17:
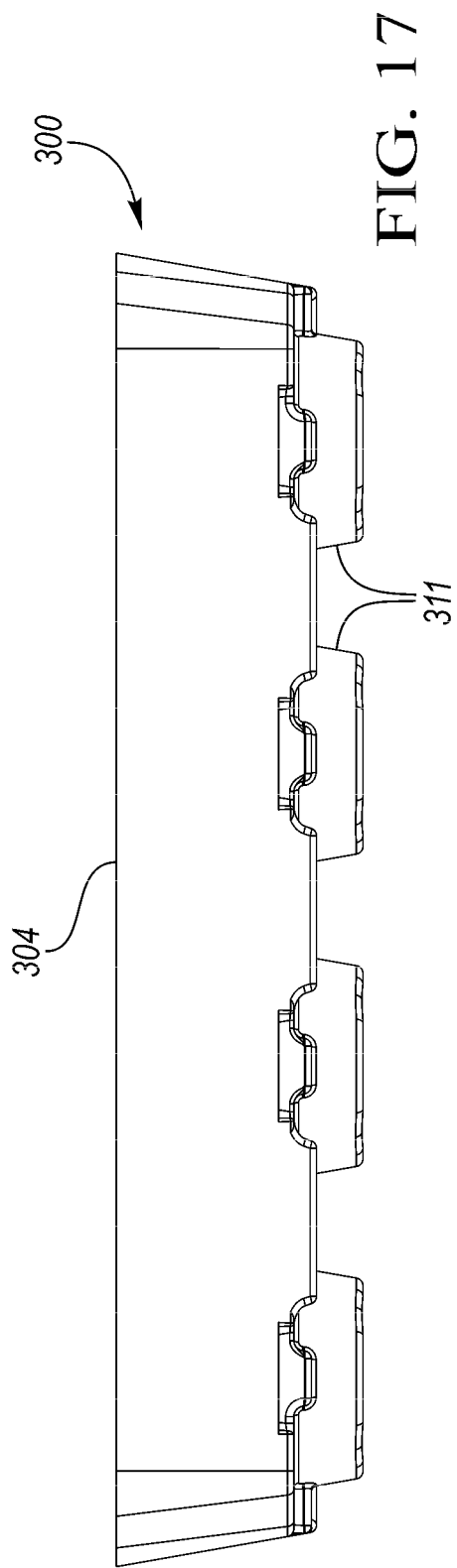
FIG. 17 is a side view of the tier sheet of FIG. 13.

FIG. 17 is a side view of the sheet 300. The outer cylindrical walls 311 extend down below the side walls 304. The bottom edge of the side walls 304 includes recesses formed by the support surfaces 307.

Figure 18:
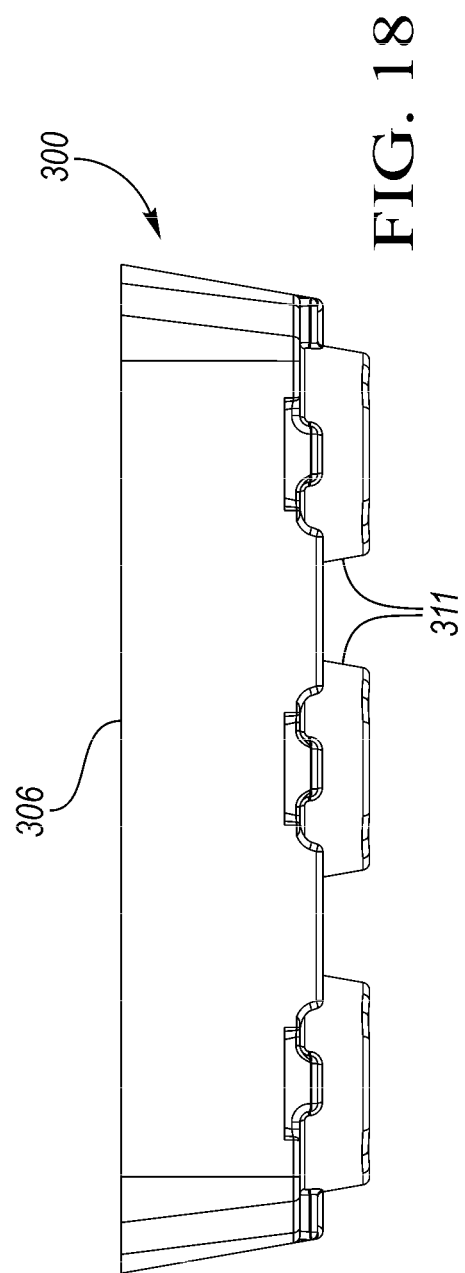
FIG. 18 is an end view of the tier sheet of FIG. 13.

FIG. 18 is an end view of the sheet 300. The outer cylindrical walls 311 extend down below the end walls 306. The bottom edge of the end walls 306 includes recesses formed by the support surfaces 307.

Figure 19:
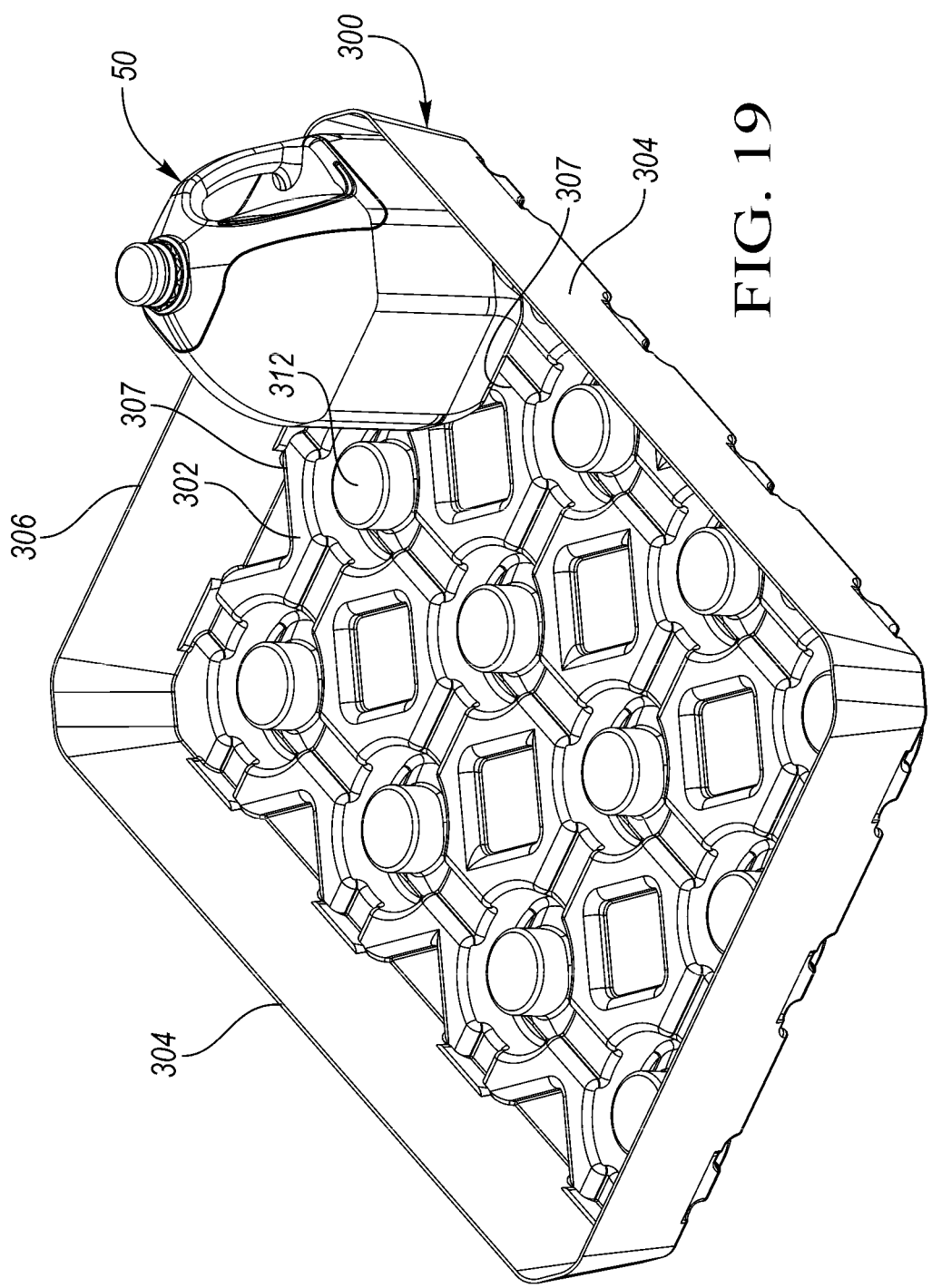
FIG. 19 shows the tier sheet of FIG. 13 with a jug stored thereon.
Figure 20:
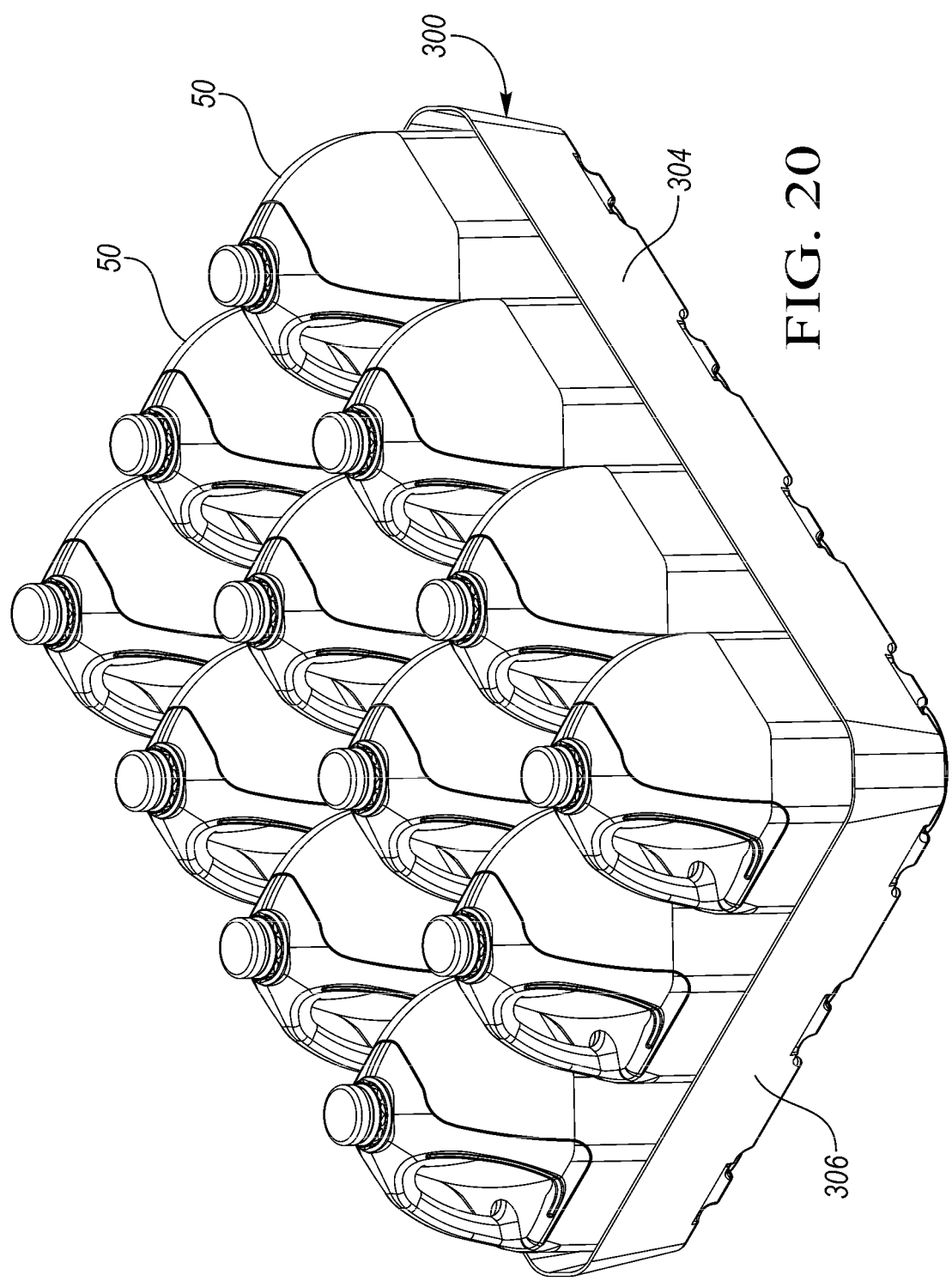
FIG. 20 shows a plurality of jugs on the tier sheet of FIG. 13.
Figure 21:
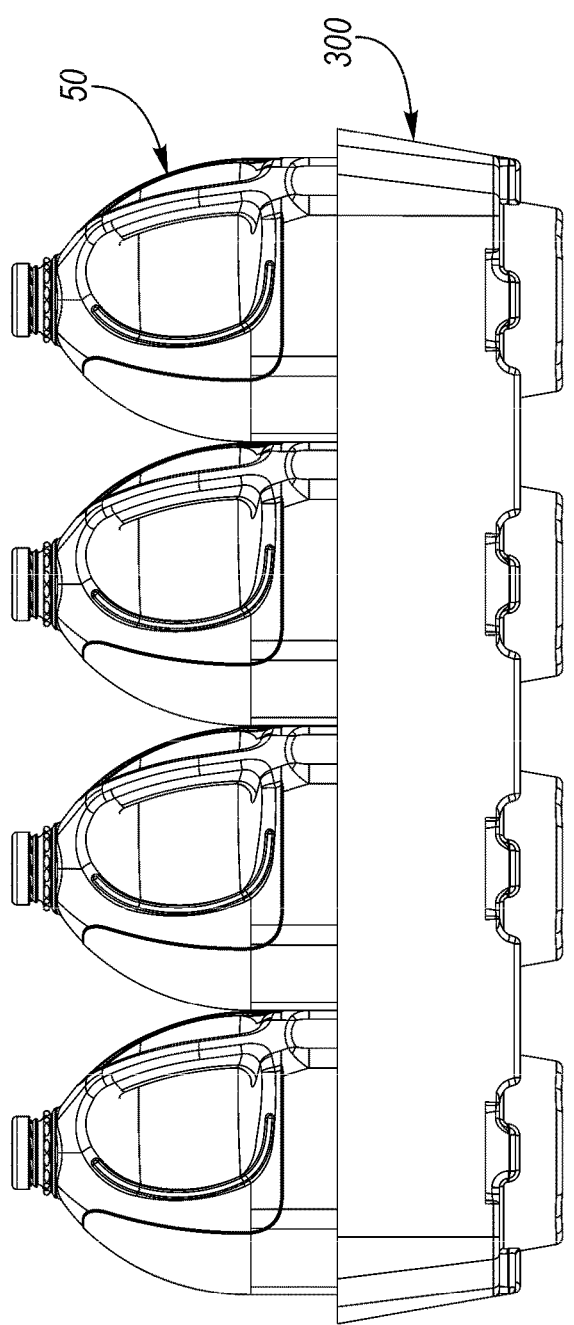
FIG. 21 is a side view of the tier sheet and jugs of FIG. 20
Figure 22:
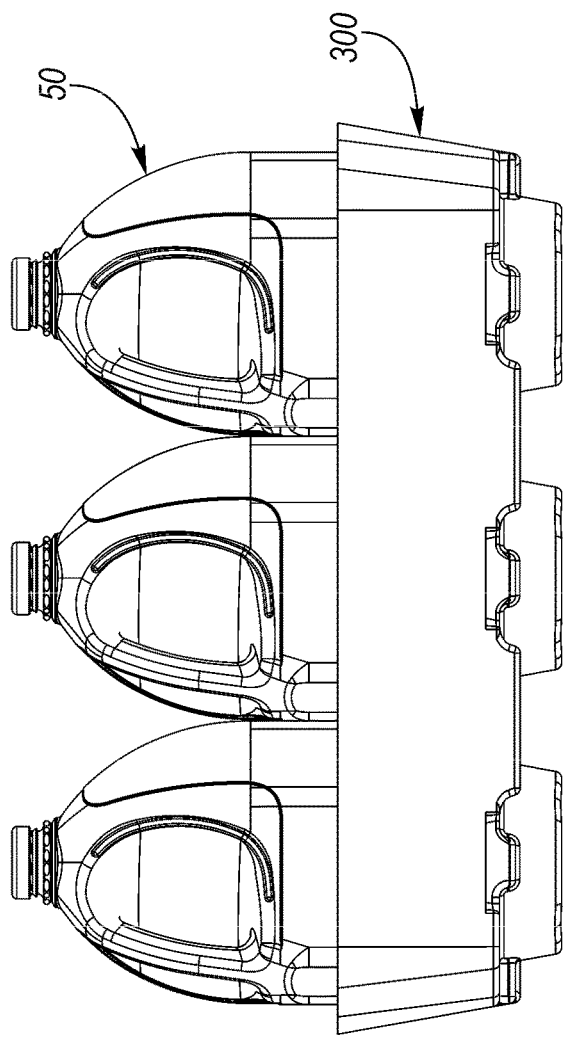
FIG. 22 is an end view of the tier sheet and jugs of FIG. 20.
Figure 23:
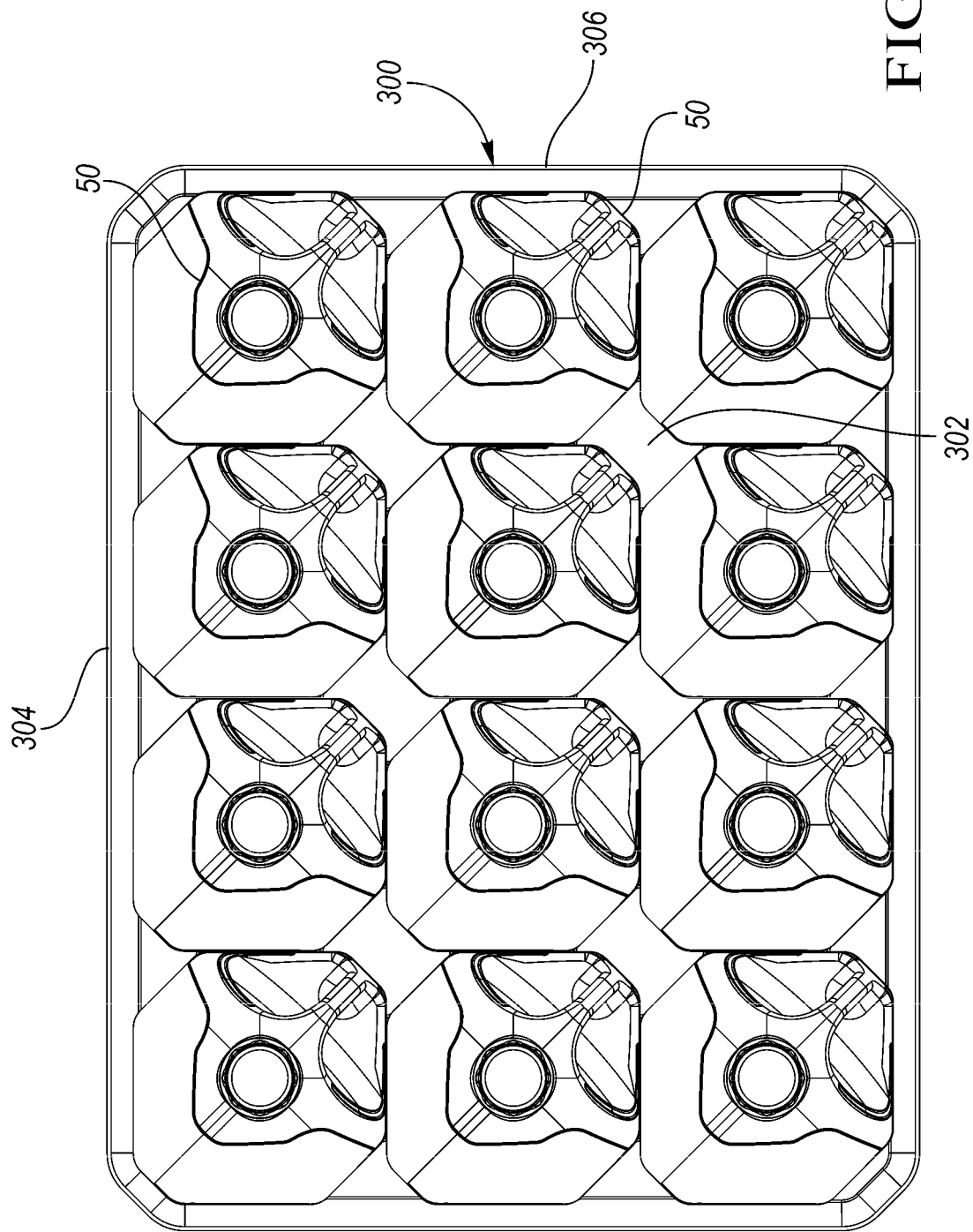
FIG. 23 is a top view of the tier sheet and jugs of FIG. 20.

As shown in FIG. 19, a jug 50 (such as a milk jug 50) can fit securely adjacent an end wall 306 and a side wall 304 on the support surface 307 and on a cylindrical column 312. The jugs 50 include body portion tapering up to a neck having a cap. The sheet 300 can be filled with jugs 50 in this manner, as shown in FIG. 20. FIG. 21 is a side view of the sheet 300 and jugs of FIG. 20. FIG. 22 is an end view of the sheet 300 and jugs 50 of FIG. 20. FIG. 23 is a top view of the sheet 300 and jugs 50 of FIG. 20.

Figure 24:
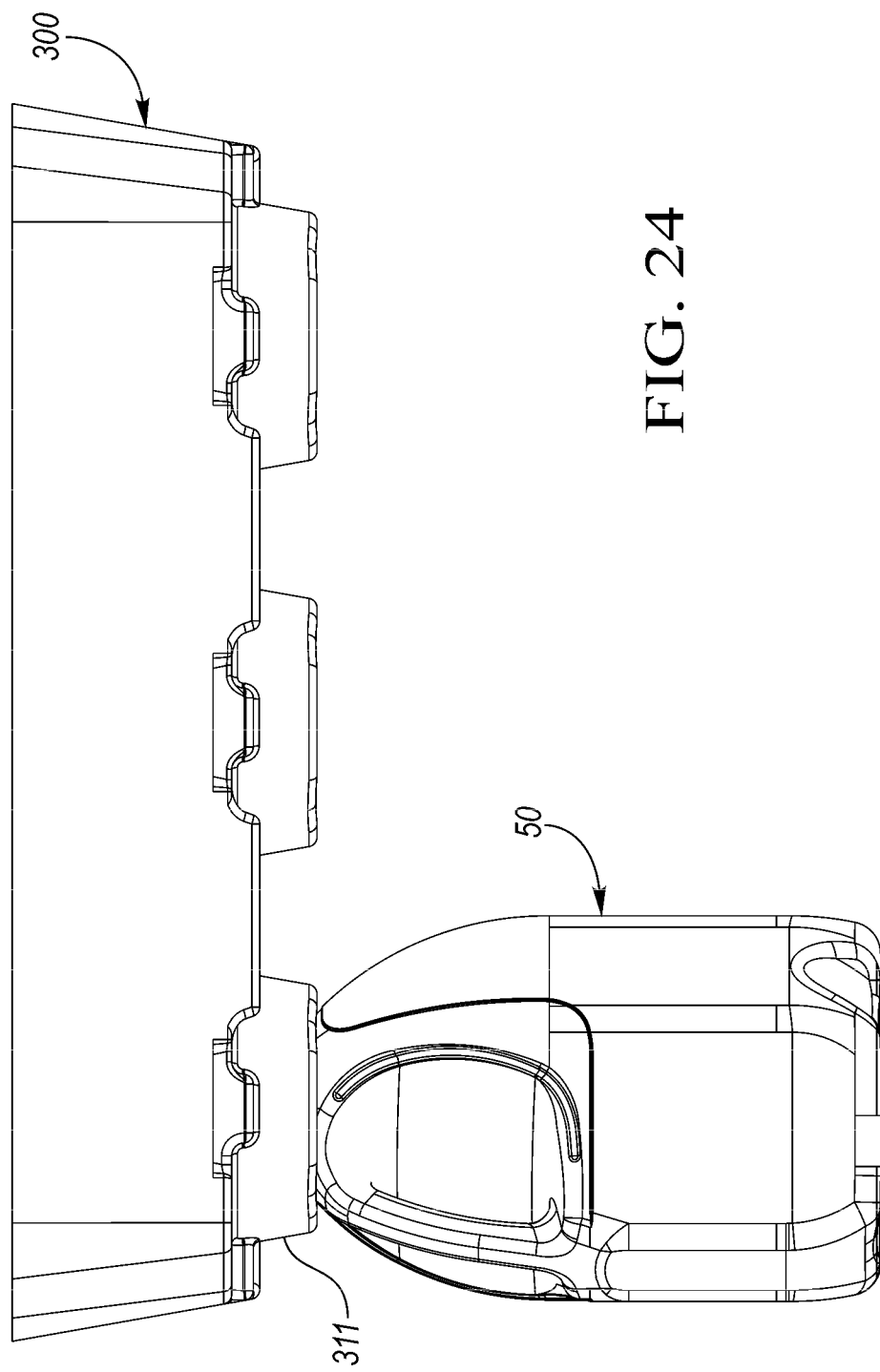
FIG. 24 is an end view of the tier sheet of FIG. 13 stacked on a jug.
Figure 25:
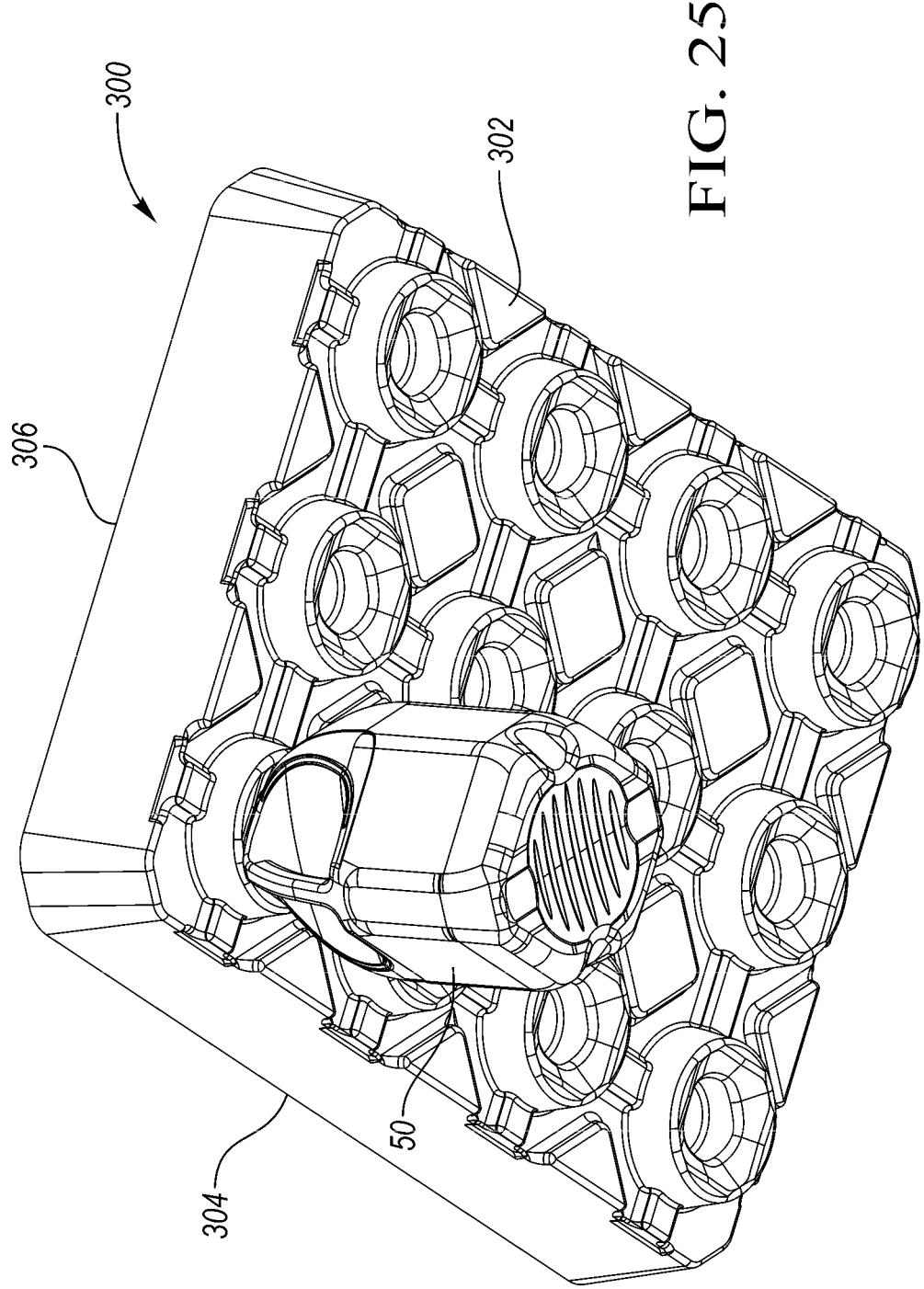
FIG. 25 is a bottom perspective view of the tier sheet and jug of FIG. 24.
Figure 27:
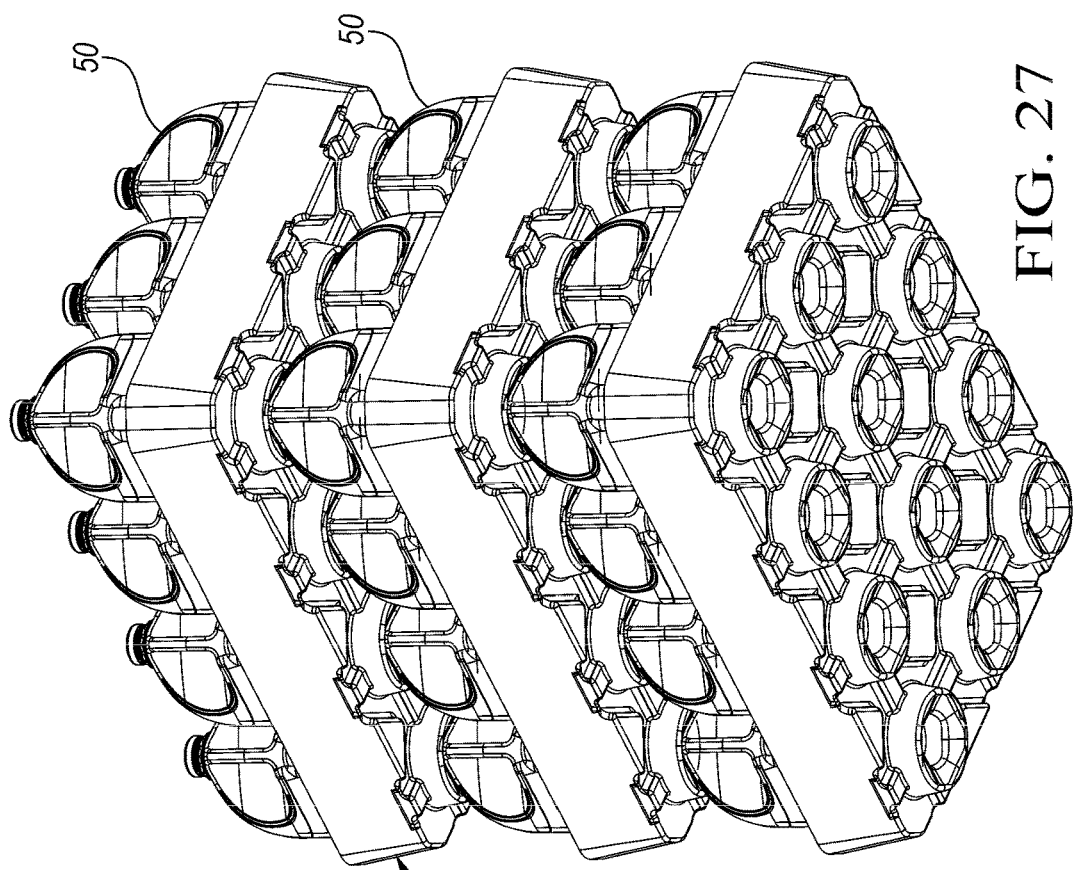
FIG. 27 is a bottom perspective view of the tier sheets and jugs of FIG. 26.

As shown in FIGS. 24 and 25, the neck and cap of each jug 50 can be received within the outer cylindrical wall 311 of a sheet 300 stacked thereon. This provides a stable stack of sheets 300 filled with jugs 50 as shown in FIGS. 26 and 27.

Figure 26:
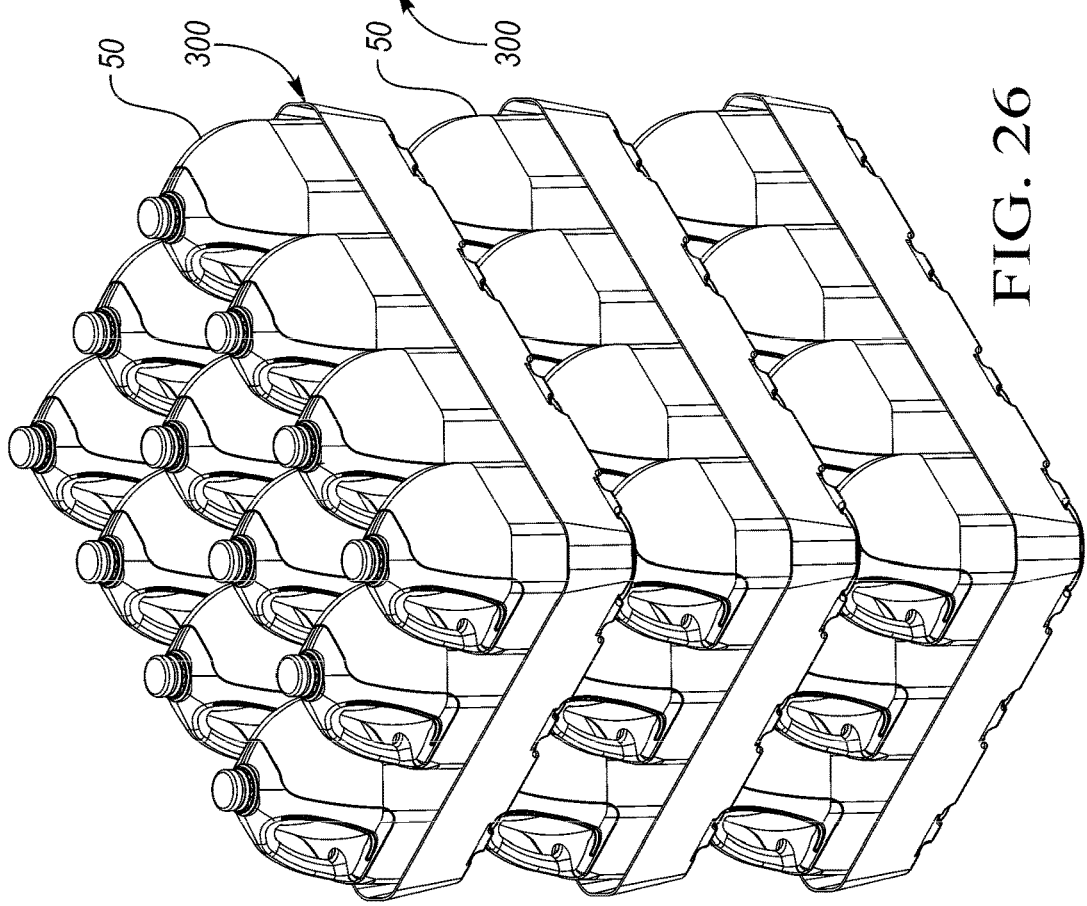
FIG. 26 shows a plurality of tier sheets of FIG. 13 loaded with jugs and stacked on one another.
Figure 28:
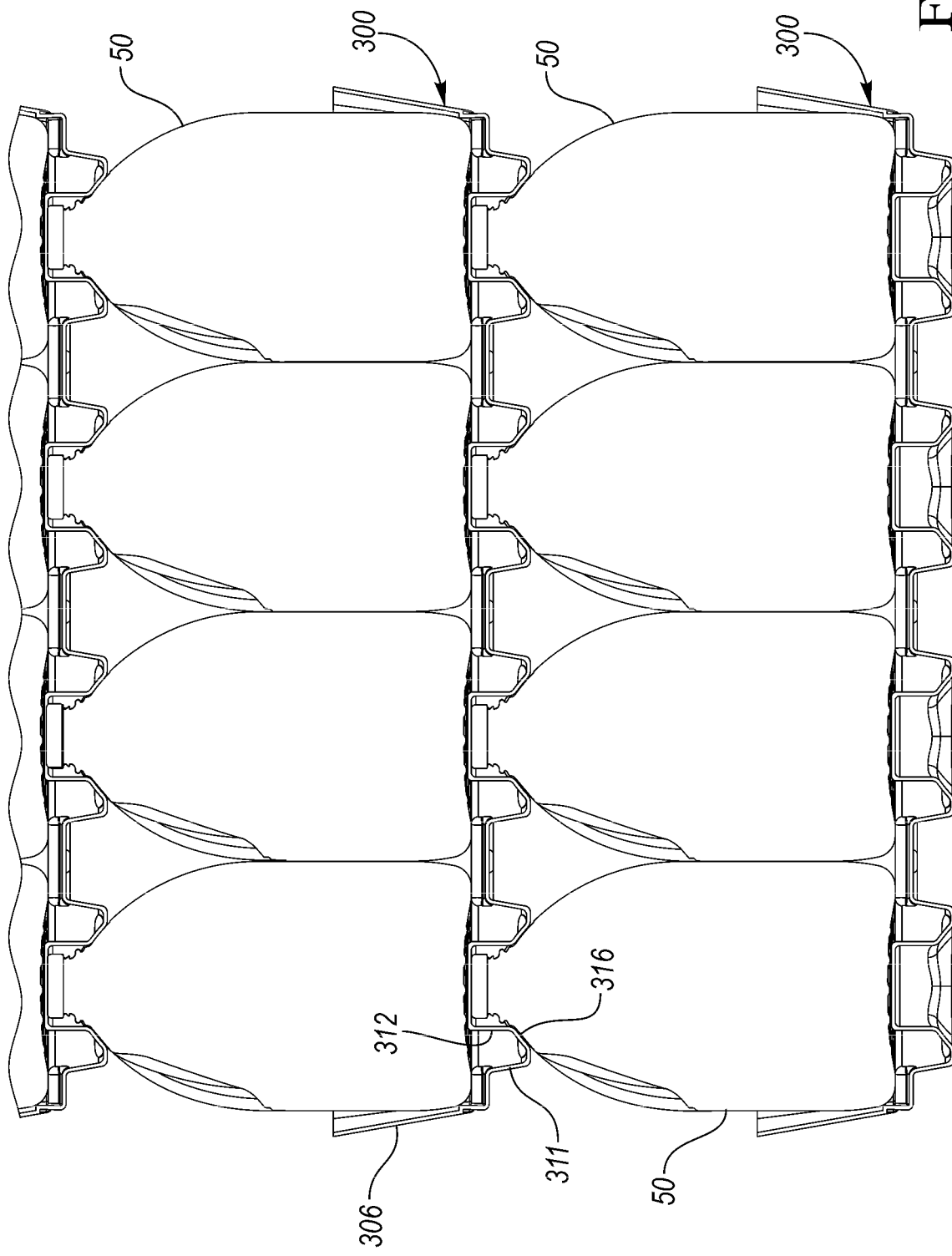
FIG. 28 is a section view through two of the layers of FIG. 26.

FIG. 28 is a section view through two layers of jugs 50 of FIG. 26. Each cap and neck of each jug 50 is received within the cylindrical column 312 of the sheet 300 stacked thereon. The tapered annular wall 316 distributes weight from the sheet 300 above to the body of the jug 50, so that not all the weight is on the cap of the jug 50. The layers of jugs 50 and tier sheets 300 may be stacked on a pallet, with four tier sheets 300 between each layer, as in the first embodiment. Again, the customer can remove one tier sheet 300 at a time to improve access to the jugs 50.

In this manner, jugs 50 can be shipped, stacked and stored in a stable stack. Consumers can remove jugs 50 from the stack. Empty sheets 300 can be nested within one another, returned and reused and eventually recycled.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:
1. A tier sheet comprising:
a deck having a support surface;
a pair of opposed side walls extending upward from the deck and a pair of opposed end walls extending upward from the deck wherein the pair of opposed side walls and the pair of opposed end walls angle outward as they extend upward such than an identical tier sheet could be nested therebetween;
a plurality of columns extending downward to define lower recesses for receiving the upper ends of containers therein;

a plurality of annular upper recesses formed in the deck, each annular upper recess defined between an outer cylindrical wall and one of the plurality of columns, wherein the outer cylindrical walls extend downward from the deck; and a plurality of recessed channels connecting the plurality of annular upper recesses to one another, wherein the recessed channels are shallower than the annular upper recesses.

2. The tier sheet of claim 1 wherein the tier sheet is a single thermoformed sheet.

3. The tier sheet of claim 1 wherein the plurality of columns open downward to form the lower recesses.

4. The tier sheet of claim 3 wherein the plurality of outer cylindrical walls extend downward from the deck, each of the plurality of outer cylindrical walls spaced outward of one of the plurality of columns.

5. The tier sheet of claim 4 further including a tapered annular wall connecting each outer cylindrical wall to the respective column.

6. The tier sheet of claim 5 wherein the outer cylindrical walls extend downward from the deck further than the plurality of columns.

7. The tier sheet of claim 6 in combination with a plurality of containers stacked therebelow, each container having a neck portion and a cap, the neck portion and cap of each container received in one of the plurality of columns.

8. The tier sheet of claim 7 wherein the plurality of containers are stacked in multiple layers with the tier sheet and one of a plurality of identical tier sheets between each layer.

9. The combination of claim 7 wherein the tapered annular walls each contact one of the plurality of containers.

10. The combination of claim 9 wherein each of the plurality of containers is supported on the support surface of the deck.

11. The combination of claim 10 wherein each of the plurality of containers includes a tapering body portion tapering up to the neck and wherein the tapered annular walls each contact the tapering body portion of one of the plurality of containers.

12. The tier sheet of claim 1 wherein the side walls are generally perpendicular to the end walls.

13. The tier sheet of claim 1 in combination with a plurality of containers, each container having a neck portion and a body portion with a generally rectangular cross section, the body portion of each container supported on one of the plurality of columns and on portions of the support surface of the deck between the plurality of annular upper recesses.

14. The tier sheet of claim 1 wherein the plurality of annular upper recesses open upward.

15. The tier sheet of claim 14 wherein the plurality of columns open downward to form the lower recesses.

16. The tier sheet of claim 14 wherein the pair of opposed side walls and the pair of opposed end walls extend upward relative to the support surface of the deck, wherein the support surface of the deck is contained on a single plane.

17. The tier sheet of claim 16 wherein the recessed channels are formed in the support surface of the deck.

18. The tier sheet of claim 17 wherein the plurality of columns have uppermost surfaces coplanar with the support surface.

19. A tier sheet and plurality of first containers in combination,
the tier sheet comprising:
a deck having a support surface;
a pair of opposed side walls extending upward from the deck and a pair of opposed end walls extending upward from the deck;
a plurality of cylindrical columns extending downward from the support surface of the deck to define lower recesses for receiving the upper ends of containers therebelow;
a plurality of annular upper recesses formed in the deck, each annular upper recess defined between an outer cylindrical wall and one of the plurality of cylindrical columns, a tapered annular wall connecting a lower end of each outer cylindrical wall to a lower end of the respective cylindrical column, wherein the outer cylindrical walls extend downward below the side walls;
a plurality of outer recesses formed in the deck adjacent the side walls, wherein the plurality of outer recesses are between the side walls and the plurality of outer cylindrical walls; and
a plurality of recessed channels connecting the plurality of upper recesses to one another, wherein the recessed channels are shallower than the upper recesses;
wherein the plurality of first containers each have a generally rectangular cross-section body portion and a neck portion, wherein the body portion of each of the plurality of first containers is supported on the support surface of the deck.

20. The tier sheet and plurality of first containers of claim 19 further in combination with a plurality of second containers stacked therebelow, each second container having a generally rectangular cross-section body portion, a neck portion and a cap, the neck portion and cap of each second container received in one of the plurality of columns.

21. The combination of claim 20 wherein the plurality of first containers and the plurality of second containers are stacked in multiple layers with the tier sheet and one of a plurality of identical tier sheets between each layer.

22. The combination of claim 21 wherein the outer recesses are triangular recesses defined above the deck adjacent the side walls, wherein the plurality of triangular recesses are between the side walls and the plurality of outer cylindrical walls.

23. The combination of claim 22 wherein the side walls are generally perpendicular to the end walls.

24. The combination of claim 23 wherein the side walls and end walls angle outward as they extend upward from the deck, such that the identical tier sheets could be nested therein when empty.

25. The tier sheet and plurality of first containers of claim 19 wherein the body portion of each of the plurality of first containers is supported on portions of the support surface of the deck that are between the plurality of annular upper recesses.

26. A tier sheet comprising:
a deck having a support surface;
a pair of opposed side walls extending upward from the deck and a pair of opposed end walls extending upward from the deck, wherein the side walls and end walls angle outward as they extend upward from the deck, such that an identical tier sheet could be nested therein when empty;
a plurality of columns extending downward to define lower recesses for receiving the upper ends of containers; and
a plurality of upper recesses formed in the deck, each upper recess defined between an outer wall and one of the plurality of columns, wherein the outer walls extend downward from the deck below the side walls to a lowermost surface of the tier sheet, a tapered wall connecting each outer wall to the respective column.

27. The tier sheet of claim 26 in combination with a plurality of first containers, each first container having a neck portion and a body portion with a generally rectangular cross section, the body portion of each first container supported on one of the plurality of columns and on the support surface of the deck between the plurality of upper recesses.

28. The tier sheet and first containers of claim 27 in combination with a plurality of second containers stacked therebelow, wherein each of the plurality of second containers includes a tapering body portion tapering up to a neck and wherein the tapered walls each contact the tapering body portion of one of the plurality of containers.

* * * * *